(12) United States Patent
Harada et al.

(10) Patent No.: US 12,261,688 B2
(45) Date of Patent: Mar. 25, 2025

(54) TERMINAL

(71) Applicant: NTT DOCOMO, INC., Tokyo (JP)

(72) Inventors: Hiroki Harada, Tokyo (JP); Satoshi Nagata, Tokyo (JP); Shaozhen Guo, Beijing (CN); Jing Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 302 days.

(21) Appl. No.: 17/632,732

(22) PCT Filed: Aug. 8, 2019

(86) PCT No.: PCT/JP2019/031536
§ 371 (c)(1),
(2) Date: Feb. 3, 2022

(87) PCT Pub. No.: WO2021/024500
PCT Pub. Date: Feb. 11, 2021

(65) Prior Publication Data
US 2022/0286222 A1    Sep. 8, 2022

(51) Int. Cl.
*H04L 27/01* (2006.01)
*H04L 1/00* (2006.01)
*H04L 5/14* (2006.01)
*H04L 27/26* (2006.01)
*H04W 72/0446* (2023.01)
*H04W 72/20* (2023.01)

(52) U.S. Cl.
CPC .......... *H04L 1/0003* (2013.01); *H04L 5/1469* (2013.01); *H04L 27/26025* (2021.01); *H04W 72/0446* (2013.01); *H04W 72/20* (2023.01)

(58) Field of Classification Search
CPC .......... H04W 72/0446; H04W 72/0457; H04J 14/02; H04J 3/06; H04J 11/00; H04B 7/212; G06F 17/00; H04L 27/01; H04L 27/34
See application file for complete search history.

(56) References Cited

U.S. PATENT DOCUMENTS 10,432,240 B1\* 10/2019 Luo .................. H04B 1/525
2018/0359123 A1   12/2018 Kimura et al.
2022/0201524 A1\*  6/2022 Ying ................ H04W 74/0866

FOREIGN PATENT DOCUMENTS

WO    2017/115609 A1    7/2017

OTHER PUBLICATIONS

3GPP TS 38.331 V15.6.0; "3rd Generation Partnership Project; Technical Specification Group Radio Access Network; NR; Radio Resource Control (RCC) protocol specification (Release 15)"; Jun. 2019 (519 pages).

(Continued)

*Primary Examiner* — Tu X Nguyen
(74) *Attorney, Agent, or Firm* — Osha Bergman Watanabe & Burton LLP

(57) ABSTRACT

A terminal receives a radio frame having a second slot pattern to be used in a case in which a modulation system (FTN) different from a modulation system in a case of using a first slot pattern is applied. The terminal applies for the second slot pattern a configuration of an uplink and a downlink according to a time division duplex in the radio frame by using a reference subcarrier spacing same as that for the first slot pattern.

3 Claims, 22 Drawing Sheets

(56) References Cited

OTHER PUBLICATIONS

H. Lin; "An Efficient FTN Implementation of the OFDM/OQAM System"; 2015 IEEE International Conference on Communication (ICC), London 2015, pp. 4787-4792 (6 pages).
International Search Report for corresponding International Application No. PCT/JP2019/031536, mailed Sep. 17, 2019 (5 pages).
Written Opinion for corresponding International Application No. PCT/JP2019/031536, mailed Sep. 17, 2019 (4 pages).
Intel Corporation; "Network coordination mechanisms for CLI"; 3GPP TSG RAN WG1 #96, R1-1902490; Athens, Greece; Feb. 25-Mar. 1, 2019 (4 pages).

* cited by examiner

FIG. 6

```
ServingCellConfigCommon ::=      SEQUENCE {
    tdd-UL-DL-ConfigurationCommon    TDD-UL-DL-ConfigCommon    OPTIONAL, -- Cond TDD
    ...
}

ServingCellConfigCommonSIB ::=    SEQUENCE {
    ...
    tdd-UL-DL-ConfigurationCommon    TDD-UL-DL-ConfigCommon    OPTIONAL, -- Cond TDD
    ...
}

TDD-UL-DL-ConfigCommon ::=    SEQUENCE {
    referenceSubcarrierSpacing    SubcarrierSpacing,
    pattern1                       TDD-UL-DL-Pattern,
    pattern2                       TDD-UL-DL-Pattern        OPTIONAL,    -- Need R
}

TDD-UL-DL-Pattern ::= SEQUENCE {
    dl-UL-TransmissionPeriodicity    ENUMERATED {ms0p5, ms0p625, ms1, ms1p25, ms2, ms2p5, ms5, ms10},
    nrofDownlinkSlots                INTEGER (0..maxNrofSlots),
    nrofDownlinkSymbols              INTEGER (0..maxNrofSymbols-1),
    nrofUplinkSlots                  INTEGER (0..maxNrofSlots),
    nrofUplinkSymbols                INTEGER (0..maxNrofSymbols-1),
    ...,
    [[
    dl-UL-TransmissionPeriodicity-v1530    ENUMERATED {ms3, ms4}    OPTIONAL    -- Need R
    ]]
} maxNrofSlots            INTEGER ::= 320    -- Maximum number of slots in a 10 ms period
maxNrofSymbols-1        INTEGER ::= 13     -- Maximum index identifying a symbol within a slot (14 symbols, indexed
                                           -- from 0..13)
```

FIG. 8

```
ServingCellConfig ::=          SEQUENCE {
    tdd-UL-DL-ConfigurationDedicated    TDD-UL-DL-ConfigDedicated    OPTIONAL,    -- Cond TDD
    ...
}

TDD-UL-DL-ConfigDedicated ::=    SEQUENCE {
    slotSpecificConfigurationsToAddModList    SEQUENCE (SIZE (1..maxNrofSlots)) OF TDD-UL-DL-SlotConfig    OPTIONAL,    -- Need N
    slotSpecificConfigurationsToreleaseList   SEQUENCE (SIZE (1..maxNrofSlots)) OF TDD-UL-DL-SlotIndex     OPTIONAL,    -- Need N
    ...
}

TDD-UL-DL-SlotConfig ::=    SEQUENCE {
    slotIndex            TDD-UL-DL-SlotIndex,
    symbols              CHOICE {
        allDownlink          NULL,
        allUplink            NULL,
        explicit             SEQUENCE {
            nrofDownlinkSymbols    INTEGER (1..maxNrofSymbols-1)    OPTIONAL,    -- Need S
            nrofUplinkSymbols      INTEGER (1..maxNrofSymbols-1)    OPTIONAL,    -- Need S
        }
    }
}

TDD-UL-DL-SlotIndex ::=    INTEGER (0..maxNrofSlots-1)
```

TERMINAL

TECHNICAL FIELD

The present invention relates to a terminal that performs radio communication, and particularly relates to a terminal that supports Faster-Than-Nyquist (FTN) transmission.

BACKGROUND ART

The 3rd Generation Partnership Project (3GPP) specifies Long Term Evolution (LTE), and with the aim of further speeding, specifies LTE-Advanced (hereinbelow, the LTE includes the LTE-Advanced). Further, specifications for 5th generation mobile communication system (5G, also called as New Radio (NR) or Next Generation (NG)) are also being considered.

For example, in Release 15 of the 3GPP, a radio communication system by time division duplex (TDD) with an uplink (UL) and a downlink (DL) has been stipulated (Non-Patent Document 1). Specifically, a format of a slot (slot format) that forms a radio frame is capable of including a UL symbol, a DL symbol, and a flexible symbol, and a slot pattern is set by parameters of an upper layer.

Moreover, the current specifications of the NR are based on a Nyquist rate, and do not support the Faster-Than-Nyquist (FTN) transmission. In the FTN, because a symbol is multiplexed at a rate faster than the Nyquist rate, it is possible to improve a spectral efficiency (SE) as compared to that in the Nyquist transmission (Non-Patent Document 2).

The FTN allows an inter-symbol interference (ISI: Inter-Symbol Interference) and an inter-subcarrier interference (Inter-subCarrier Interference), and improves the spectral efficiency by multiplexing a symbol to a high density.

PRIOR ART DOCUMENT

Non-Patent Document

Non-Patent Document 1: TS 38.331 V15.6.0, 3rd Generation Partnership Project; Technical Specification Group Radio Access Network; NR; Radio Resource Control (RRC) protocol specification (Release 15), 3GPP, June 2019

Non-Patent Document 1: H. Lin, N. Lahbabi, P. Siohan and X. Jiang, "An efficient FTN implementation of the OFDM/OQAM system", 2015 IEEE International Conference on Communications (ICC), London, 2015, pp. 4787-4792

SUMMARY OF THE INVENTION

When the FTN is applied, a symbol length (time length of a symbol) may differ from that in a case of the Nyquist transmission. Therefore, in a case in which the FTN is applied to at least one of the UL or the DL, a case in which a slot boundary or a symbol boundary does not match in the UL and the DL due to the slot pattern and an FTN modulation factor may arise.

The present invention has been made in view of such circumstances, and one object of the present invention is to provide a terminal that is capable of operating appropriately even in a case in which the Faster-Than-Nyquist (FTN) is applied in a TDD-UL-DL.

According to one aspect of the present disclosure a terminal (UE 200) includes a receiving unit (FTN demodulation module) that receives a radio frame having a second slot pattern to be used in a case in which a modulation system (FTN) different from a modulation system in a case of using a first slot pattern is applied; and a control unit that applies for the second slot pattern a configuration of an uplink and a downlink according to a time division duplex in the radio frame by using a reference subcarrier spacing same as a reference subcarrier spacing for the first slot pattern.

According to another aspect of the present disclosure a terminal (UE 200) includes a receiving unit (FTN demodulation module) that receives a radio frame having a second slot pattern to be used in a case in which a modulation system (FTN) different from a modulation system in a case of using a first slot pattern is applied; and a control unit that determines for the second slot pattern a reference subcarrier spacing on the basis of a configuration of the modulation system, and applies a configuration of an uplink and a downlink according to a time division duplex in the radio frame.

According to still another aspect of the present disclosure a terminal (UE 200) includes a receiving unit (FTN demodulation module) that receives a radio frame having a second slot pattern to be used in a case in which a modulation system (FTN) different from a modulation system in a case of using a first slot pattern is applied; and a control unit that applies for the second slot pattern same configuration as in a case of using the first slot pattern for at least one of a common configuration (TDD-UL-DL-ConfigCommon) of an uplink and a downlink according to the a time division duplex, and a dedicated configuration (TDD-UL-DL-ConfigDedicated) for the uplink and the downlink according to the time division duplex.

BRIEF DESCRIPTION OF DRAWINGS

FIG. 6 is a diagram illustrating a conventional signaling example (RRC) of the TDD-UL-DL-ConfigCommon.

FIG. 8 is a diagram illustrating a conventional signaling example (RRC) of the TDD-UL-DL-ConfigDedicated.

MODES FOR CARRYING OUT THE INVENTION

Figure 1:
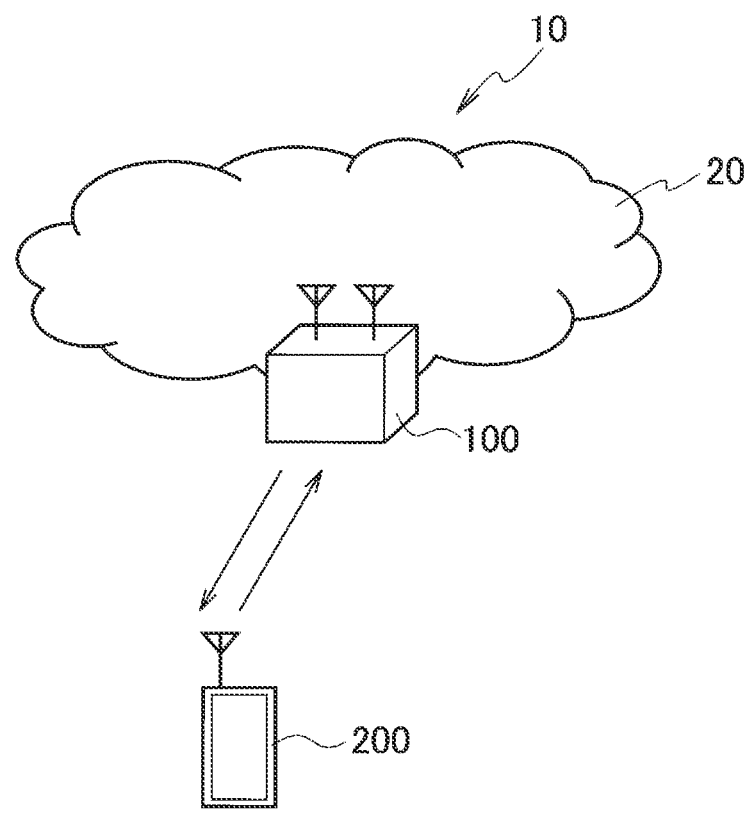
FIG. 1 is an overall schematic configuration diagram of a radio communication system 10.

Exemplary embodiments of the present invention are explained below with reference to the accompanying drawings. Note that, the same or similar reference numerals have been attached to the same functions and configurations, and the description thereof is appropriately omitted.

(1) Overall Schematic Configuration of Radio Communication System

FIG. 1 is an overall schematic configuration diagram of a radio communication system 10 according to the present embodiment. The radio communication system 10 is a radio communication system according to 5G New Radio (NR). The radio communication system 10 includes Next Generation-Radio Access Network 20 (hereinafter, "NG-RAN 20") and a terminal 200 (hereinafter, "UE 200", "User Equipment").

The NG-RAN 20 includes a radio base station 100 (hereinafter, "gNB 100"). A concrete configuration of the radio communication system 10, including the number of the gNBs and the UEs, is not limited to the example shown in FIG. 1.

The NG-RAN 20 actually includes a plurality of NG-RAN Nodes, in particular, the gNBs (or ng-eNB). Also, the NG-RAN 20 is connected to a core network (5GC, not shown) according to the 5G. The NG-RAN 20 and the 5GC may be simply expressed as "network".

The gNB 100 is a radio base station according to the 5G. The gNB 100 performs a radio communication with the UE 200 according to the 5G. The gNB 100 and the UE 200 can handle, by controlling a radio signal transmitted from a plurality of antenna elements, Massive MIMO (Multiple-Input Multiple-Output) that generates a beam with a higher directivity, carrier aggregation (CA) that bundles a plurality of component carriers (CC) to use, dual connectivity (DC) in which communication is performed simultaneously between two NG-RAN Nodes and the UE, and the like.

The radio communication system 10 corresponds to FR1 and FR2. The frequency band of each FR is as below.

FR1: 410 MHz to 7.125 GHz

FR2: 24.25 GHz to 52.6 GHz

In FR1, 15 kHz, 30 kHz, or 60 kHz Sub-Carrier Spacing (SCS) is used, and a bandwidth (BW) of 5 MHz to 100 MHz is used. FR2 has a higher frequency than FR1. Moreover, FR2 uses SCS of 60 kHz or 120 kHz (240 kHz may be included), and uses a bandwidth (BW) of 50 MHz to 400 MHz.

Note that SCS may be interpreted as numerology. The numerology is defined in 3GPP TS38.300 and corresponds to one subcarrier spacing in the frequency domain.

Furthermore, the radio communication system 10 can handle a frequency band that is higher than the frequency band of FR2. Specifically, the radio communication system 10 can handle a frequency band exceeding 52.6 GHz and up to 114.25 GHz. Here, such a high frequency band is referred to as "FR4" for convenience. FR4 belongs to so-called EHF (extremely high frequency, also called millimeter wave). FR4 is a temporary name and may be called by another name.

FR4 may be further classified. For example, FR4 may be divided into a frequency range of 70 GHz or less and a frequency range of 70 GHz or more. Alternatively, FR4 may be divided into more frequency ranges, and may be divided in frequencies other than 70 GHz.

Here, the frequency band between FR2 and FR1 is referred to as "FR3" for convenience. FR3 is a frequency band above 7.125 GHz and below 24.25 GHz.

In the present embodiment, FR3 and FR4 are different from the frequency band including FR1 and FR2, and may be called different frequency bands.

Particularly, as described above, in a high frequency band such as FR4, an increase in phase noise between carriers becomes a problem. This may require application of a larger (wider) SCS or a single carrier waveform.

Also, a narrower beam (i.e., a larger number of beams) may be required due to increased propagation loss. In addition, since it is more sensitive to PAPR and power amplifier nonlinearity, a greater (wider) SCS (and/or fewer FFT points), a PAPR reduction mechanism, or a single carrier waveform may be required.

In order to address these issues, in this embodiment, particularly, when using a band exceeding 52.6 GHz, Cyclic Prefix-Orthogonal Frequency Division Multiplexing (CP-OFDM) or Discrete Fourier Transform-Spread (DFT-S-OFDM) having a larger Sub-Carrier Spacing (SCS) can be applied.

Moreover, in the radio communication system 10, it is possible to support Faster-Than-Nyquist (FTN) transmission. In the FTN, because a symbol (specifically, an OFDM symbol, appropriately abbreviated as "symbol") is multiplexed at a rate faster than the Nyquist rate, it is possible to improve a spectral efficiency as compared to the Nyquist transmission.

The FTN allows an inter-symbol interference (ISI: Inter-Symbol Interference) and an inter-subcarrier interference (Inter-subCarrier Interference), and improves the spectral efficiency by multiplexing the OFDM symbol to a high density. The spectral efficiency may be simply called as a usage efficiency, or may be called as Spectral Efficiency (SE) and the like.

Figure 2:
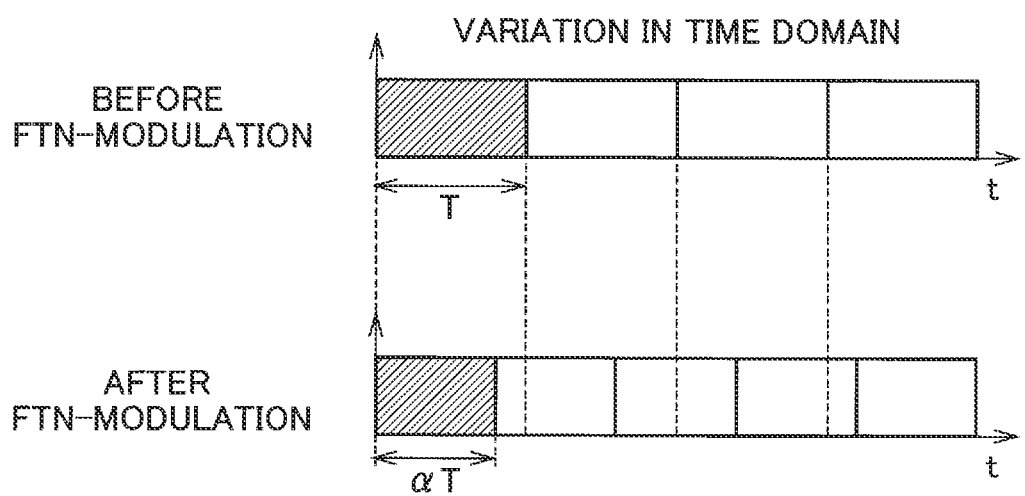
FIG. 2 is a diagram illustrating a variation in a time domain in a combination of FTN and DFT-S-OFDM.
Figure 3:
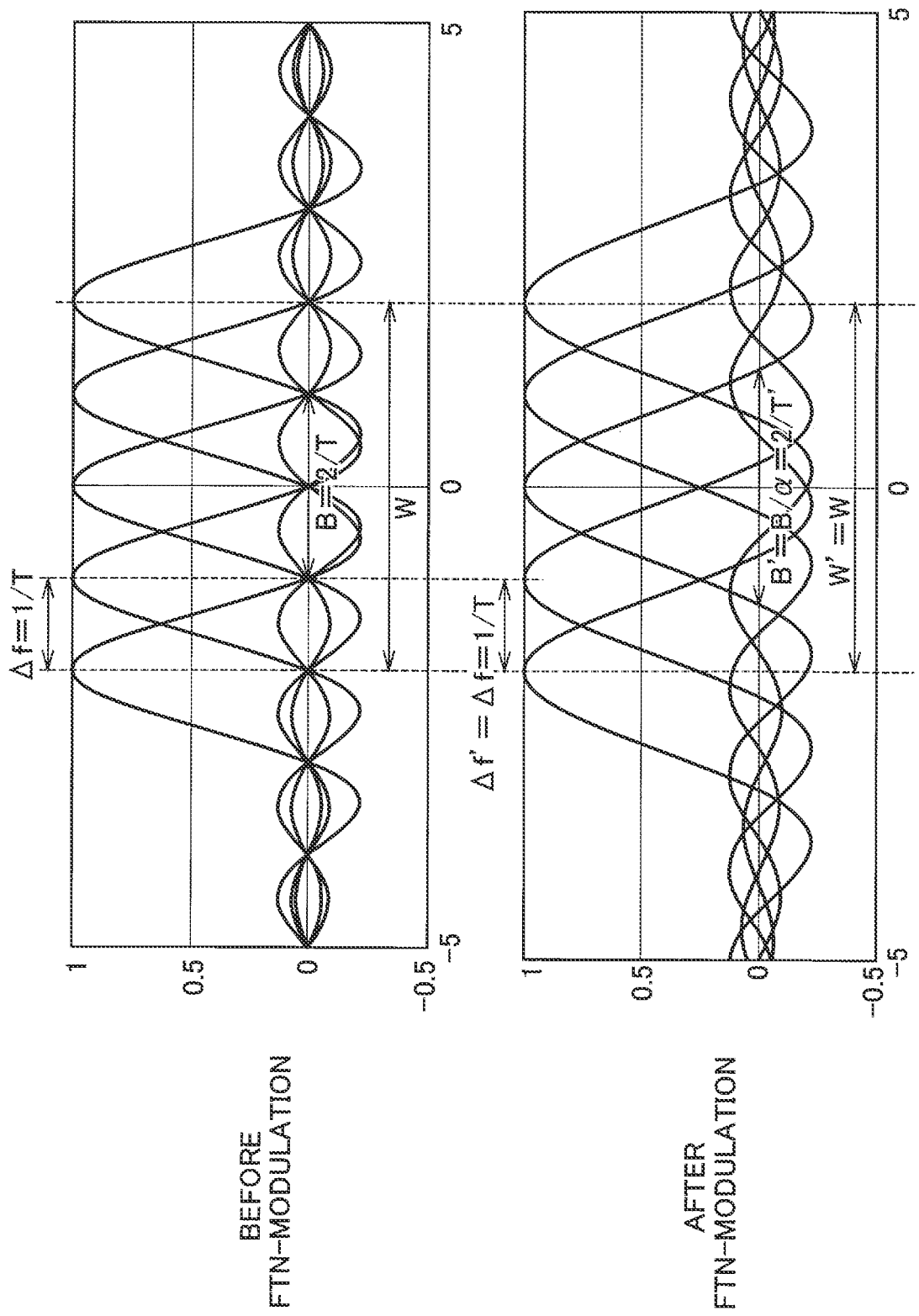
FIG. 3 is a diagram illustrating a variation in a frequency domain in the combination of the FTN and the DFT-S-OFDM.

FIG. 2 illustrates a variation in a time domain in a combination of the FTN and a DFT-S-OFDM. Moreover, FIG. 3 shows a variation in a frequency domain in the combination of the FTN and the DFT-S-OFDM.

A non-orthogonal subcarrier can be expressed as follows.

subcarrier interval ($\Delta f$)×OFDM symbol ($T$)=$\alpha$<1 s

Here, $\alpha$ is called as FTN modulation factor. As shown in FIG. 2, when 'before FTN-modulation' and 'after FTN-modulation' are compared, in the 'after FTN-modulation', a symbol length of the OFDM symbol is subjected to scaling by the FTN modulation factor $\alpha$. Note that, $\alpha$ may also be called as Squeezing factor and the like.

Specifically, the signal length becomes shorter than that 'before FTN-modulation', that is, when compared with the 'before FTN-modulation', the OFDM symbol is squeezed in a time direction. The degree of squeezing can be controlled by $\alpha$.

Note that, the symbol length may also be called as time length of symbol, symbol length, symbol period, symbol time, or the like.

Moreover, as shown in FIG. 3, a subcarrier bandwidth (B') of 'after FTN-modulation' is, $\alpha$, that is, is practically extended by the OFDM symbol squeezed in the time direction, and transmission at even faster rate is possible.

In such manner, in a case in which the FTN that performs squeezing of a time domain in the OFDM, the OFDM symbol of each subcarrier is multiplexed at a rate faster than the Nyquist rate. Accordingly, it is possible to facilitate improvement of the throughput (communication capacity). Table 1 shows an example of FTN limit value (FTN limit) and a rate growth (Rate growth) corresponding to a modulation order (modulation system) (Reference, Non-Patent Document 2).

TABLE 1

|  | FTN limit | Rate growth |
| --- | --- | --- |
| QPSK | 0.5 | 2 |
| 16QAM | 0.7 | 1.43 |
| 64QAM | 0.9 | 1.11 |

As shown in Table 1, irrespective of the modulation order (modulation system), it is possible to improve the throughput according to the FTN. The FTN limit value (FTN limit) is FTN modulation factor ($\alpha$) for which no degradation of a bit error rate (BER) occurs, and as the modulation order becomes higher, the efficiency is degraded. That is, the maximum gain (rate growth) of the FTN for which no BER degradation occurs, becomes lower as the modulation order becomes higher.

For instance, in Quadrature Phase Shift Keying (QPSK), the FTN limit is 0.5, and the OFDM symbol is squeezed to a time length half of that before the FTN modulation. Accordingly, the rate rises up to twofold.

When such characteristic of the FTN is taken into consideration, in a case in which, the spectral efficiency (SE) and the modulation order are same for example, the FTN transmission due to a low coding rate can be said to exert BER characteristic superior to that in the Nyquist transmission due to a high coding rate.

Moreover, in a case in which the modulation order and the coding rate are fixed, the FTN transmission can be said to be able to achieve even higher SE while allowing an increase in the BER to some extent.

Furthermore, in a case in which the modulation order is fixed and the coding rate differs, the FTN transmission can be said to be able to achieve both of high SE and low BER by adjusting the FTN modulation factor ($\alpha$) and the coding rate.

(2) Functional Block Configuration of Radio Communication System

Specifically, a functional block configuration of the gNB 100 and the UE 200 will be described below.

Figure 4:
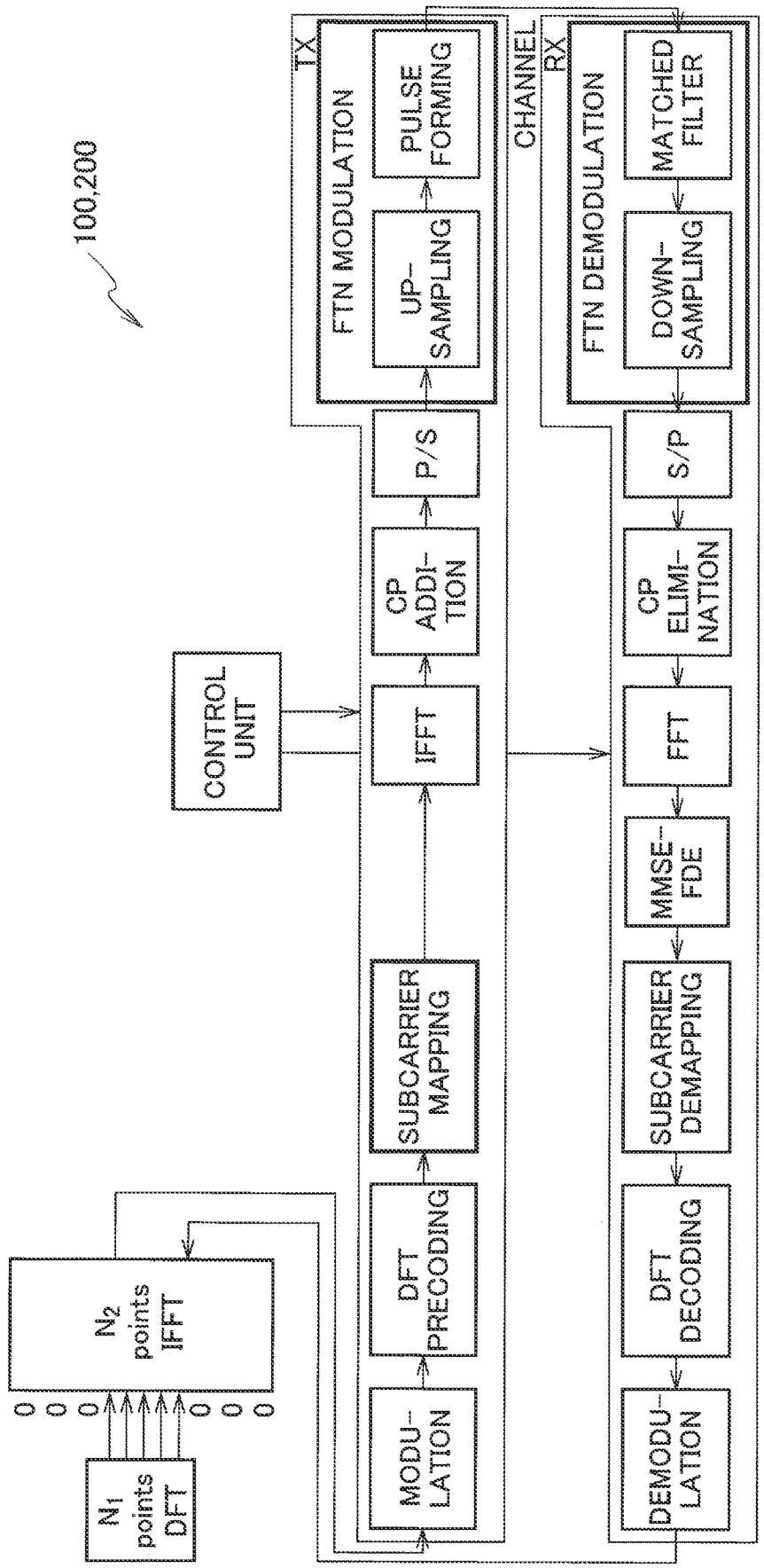
FIG. 4 is schematic functional block diagram of gNB 100 and UE 200.

FIG. 4 is a schematic functional block diagram of the gNB 100 and the UE 200. Since the gNB 100 and the UE 200 have a similar schematic functional block configuration, the description will be made below with a functional block of the UE 200 as an example.

As mentioned above, in the radio communication system 10, the DFT-S-OFDM (applicable to both the downlink (DL) and the uplink (UL)) and the FTN are applicable. The DFT-S-OFDM in particular, is preferable from a viewpoint of securing a PAPR.

The limited number of RF chains can degrade the SE; however, in the FTN, it is possible to improve the SE by using a waveform squeezed in the time direction.

It is to be noted that the schematic functional block diagram shown in FIG. 4 indicates mainly a portion related to the FTN and the DFT-S-OFDM. In FIG. 4, the related function block is indicated by dividing into a transmission (TX) side and a reception (RX) side.

On the transmission side, because the DFT-S-OFDM is used, after modulation with a modulation method selected, DFT precoding is performed, and mapping of subcarrier is performed on a signal. The subcarrier is a sine wave having a different carrier frequency, and a phase and an amplitude of each subcarrier are set according to a type of the symbol transmitted. Here, application of the FTN is taken into consideration, and an intensive mapping of a subcarrier of a low frequency is performed.

Thereafter, an inverse fast Fourier transform (IFFT) is performed on the plurality of symbols, and a time signal sequence is output. The plurality of symbols input is transmitted in parallel by separate carriers. Moreover, a cyclic prefix (CP) is added to the OFDM signal after the IFFT.

On the transmission side, at a stage subsequent to the CP addition, that is, after the DFT-S-OFDM, FTN modulation module is provided.

The FTN modulation module, in accordance with the FTN, multiplexes the OFDM symbol at a rate faster than the Nyquist rate. Specifically, the FTN modulation module has a waveform forming function after an up-sampling and the aforementioned sampling.

On the reception side, a processing opposite to that on the transmission side mentioned above is performed. On the reception side, a frequency-domain equalization (FDE) function based on a minimum mean-square error (MMSE) is mounted. Accordingly, equalizing of the frequency-domain based on the MMSE is performed, and it is possible to improve the BER characteristics.

Specifically, a combination of the FTN and the DFT-S-OFDM using the FDE is capable of improving the SE that the DFT-S-OFDM alone, while sacrificing an appropriate increase in a signal-to-noise ratio (SNR). Moreover, the combination of the FTN and the DFT-S-OFDM using the FDE is capable of achieving a performance of the BER and SE similar to that in a case in which a CP-OFDM is used.

Moreover, on the reception side, at a stage prior to CP elimination, FTN demodulation module is provided. The FTN demodulation module has a matched filter (matched filter), a down-sampling function, and the like.

The FTN modulation module and the FTN demodulation module transmit and receive a slot that is formed by a plurality of symbols (specifically, may be called as OFDM symbol or FTN symbol as it is subsequent to the FTN). In the present embodiment, a block on the reception (RX) side including the FTN demodulation module forms a receiving unit that receives a radio frame.

The slot is a range (period) in the time direction (may be called as time domain) included in the radio frame. In the present embodiment, a 14-symbol/slot is supported; however, a slot including symbols whose number is an integral multiple of 14 may be supported.

The FTN modulation module and the FTN demodulation module may transmit and receive radio frames of a plurality of types having different slot patterns. The different slot patterns may signify that at least one of the number, symbol length, slot boundary or symbol boundary of the UL symbol, the DL symbol, and the flexible symbol differs.

In the present embodiment, the FTN modulation module and the FTN demodulation module, as in Release 15 of the 3GPP (hereinafter, appropriately abbreviated as Release 15), may transmit and receive a radio frame having a slot pattern (a first slot pattern) used in a case in which the FTN is not applied, or specifically, a slot pattern that is applied to a normal OFTM (CP-OFDM or DFT-S-OFDM) according to the Nyquist transmission, and is capable of transmitting and receiving a radio frame having a slot pattern (second slot pattern) that is used in a case in which an FTN which is a modulation system different from such modulation system.

That is, the FTN demodulation module is capable of receiving a radio frame having the second slot pattern that is used in a case in which a modulation system different from that in a case in which the first slot pattern is used, is applied.

A control unit shown in FIG. 4 controls each functional block forming a transmission side and a reception side of the UE 200. Particularly, in the present embodiment, even in a slot pattern to be used in a case in which the FTN is applied (second slot pattern), by using a reference subcarrier spacing same as for the slot pattern to be used in a case in which the FTN is not applied (first slot pattern), configuration of the uplink (UL) and the downlink (DL) according to the time division duplex (TDD) in the radio frame is applicable.

Specifically, the control unit it capable of applying the configuration of the UL and DL according to the TDD (hereinafter, appropriately abbreviated as TDD-UL-DL) by using the reference subcarrier spacing similar as in Release 15.

Moreover, the control unit, in a case of the slot pattern to be used when the FTN is applied, is capable of determining the reference subcarrier spacing on the basis of the configuration of the FTN and applying the configuration of the uplink and the downlink according to the TDD (TDD-UL-DL) on the radio frame.

Specifically, the control unit, for at least one of the UL and the DL, is capable of determining the reference subcarrier spacing (Reference SCS, equivalent SCS) corresponding to a case in which the FTN has not been set or has been disabled, or in a case in which the FTN has been set or has been enabled.

Moreover, the control unit, in a case of the slot pattern to be used in a case in which the FTN is applied, for at least one of a common configuration of the UL and the DL according to the TDD and a dedicated configuration of the UL and the DL according to the TDD, is capable of applying a configuration same as for the slot pattern to be used in a case in which the FTN has not been applied.

Specifically, the control unit, for at least one of the TDD-UL-DL-ConfigCommon and the TDD-UL-DL-ConfigDedicated, is capable of applying the configuration similar as in Release 15.

A specific example of the slot pattern to be used in a case in which, the FTN is applied will be described later. Moreover, as it will be described later, the FTN may be applied to only one of the UL and the DL, and the application of the FTN is not to be excluded for both the UL and the DL.

Note that, the UE 200, for performing the radio communication according to the NR, supports a processing related to stipulated reference signal, control signal, control channel, and data channel.

The UE 200, for example, executes processing by using reference signals (RS) such as Demodulation reference signal (DMRS) and Phase Tracking Reference Signal (PTRS).

DMRS is a known reference signal (pilot signal) for estimating a fading channel used for data demodulation between a base station specific for a terminal and the terminal. PTRS is a terminal-specific reference signal for the purpose of estimating phase noise which is an issue in the high frequency band.

The reference signal includes, apart from DMRS and PTRS, Channel State Information-Reference Signal (CSI-RS) and Sounding Reference Signal (SRS).

Moreover, the UE 200 transmits and receives a control signal of the radio resource control layer (RRC) via the control channel.

A channel includes a control channel and a data channel. A control channel includes PDCCH (Physical Downlink Control Channel), PUCCH (Physical Uplink Control Channel), PRACH (Physical Random Access Channel), PBCH (Physical Broadcast Channel), and the like.

A data channel includes PDSCH (Physical Downlink Shared Channel), PUSCH (Physical Downlink Shared Channel), and the like. Data means data transmitted via a data channel.

The UE 200 transmits and receives Protocol Data Unit (PDU) and Service Data Unit (SDU). Specifically, the UE 200 executes PDU/SDU assembly/disassembly and the like in multiple layers (such as medium access control layer (MAC), radio link control layer (RLC), and packet data convergence protocol layer (PDCP)).

(3) Operation of Radio Communication System

Next, an operation of the radio communication system 10 will be explained below. Specifically, the configuration of the TDD-UL-DL at the time of FTN application will be explained.

(3.1) Conventional Example

Figure 5A:
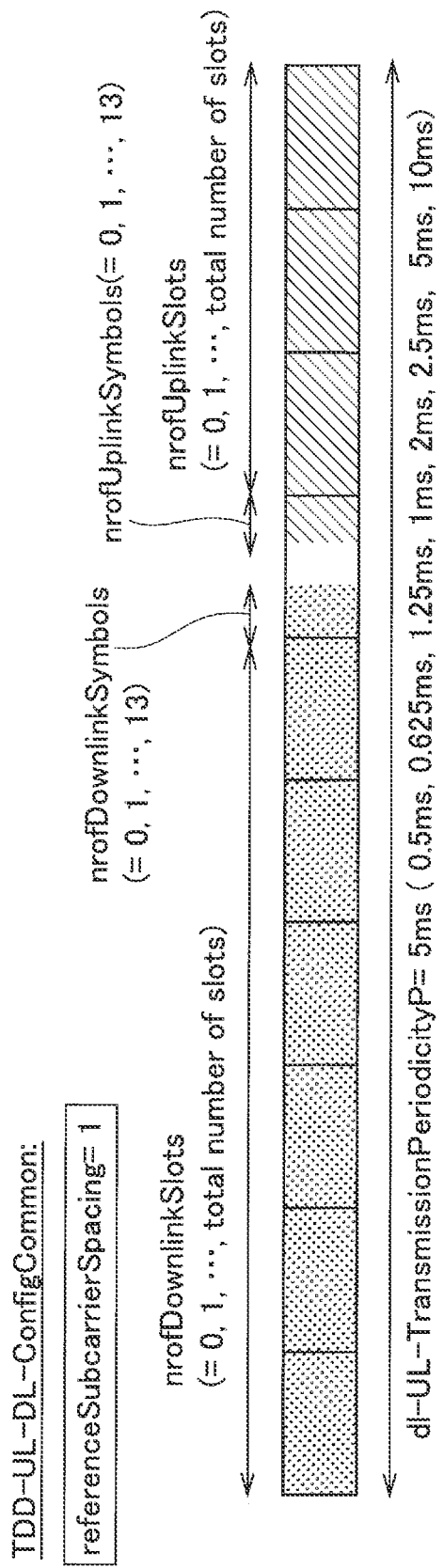
FIG. 5A is a diagram illustrating a configuration example (Part 1) of a conventional slot pattern according to TDD-UL-DL-ConfigCommon.
Figure 5B:
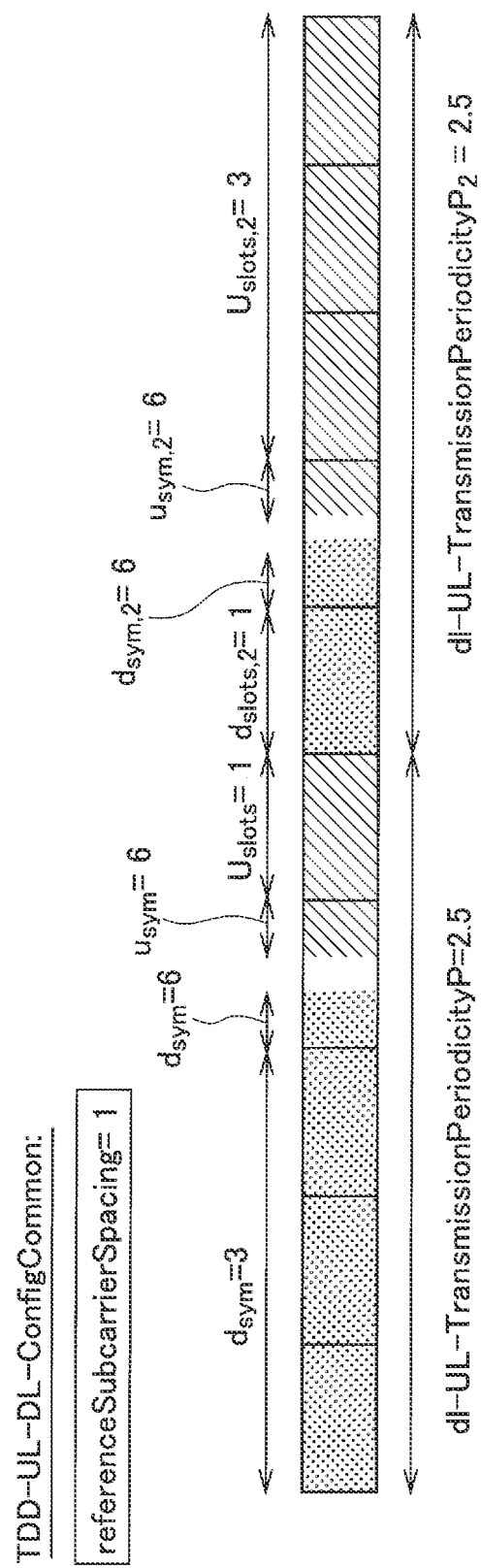
FIG. 5B is a diagram illustrating a configuration example (Part 2) of the conventional slot pattern according to the TDD-UL-DL-ConfigCommon.

To begin with, as a conventional example, TDD configuration in Release 15 of the 3GPP will be explained. FIG. 5A and FIG. 5B show configuration examples of a conventional slot pattern according to the TDD-UL-DL-ConfigCommon. FIG. 6 shows a conventional signaling example (RRC) of the TDD-UL-DL-ConfigCommon.

The slot format can include a UL symbol (dotted-line portion in the diagram), a DL symbol (hatched portion in the diagram), and a flexible symbol (FL symbol). In a case of a semi-static TDD configuration, it is possible to set the slot pattern according to parameters of an upper layer (RRC), or specifically, according to the TDD-UL-DL-ConfigCommon and/or TDD-UL-DL-ConfigDedicated.

In the TDD-UL-DL-ConfigCommon, it is possible to set two patterns (patterns 1 and 2), and in a case of pattern 1 only, a pattern periodicity, the number of DL-only slots, the number of DL-only slots, the number of DL symbols, the number of UL-only slots, and the number of UL symbols are set.

In a case in which patterns 1 and 2 (corresponding to FIG. 5A and FIG. 5B respectively) are set, even for pattern 2 similarly, the pattern periodicity, the number of DL-only slots, the number of DL symbols, the number of UL-only slots, and the number of UL symbols are set, and pattern 1 and pattern 2 are repeated alternately.

Figure 7:
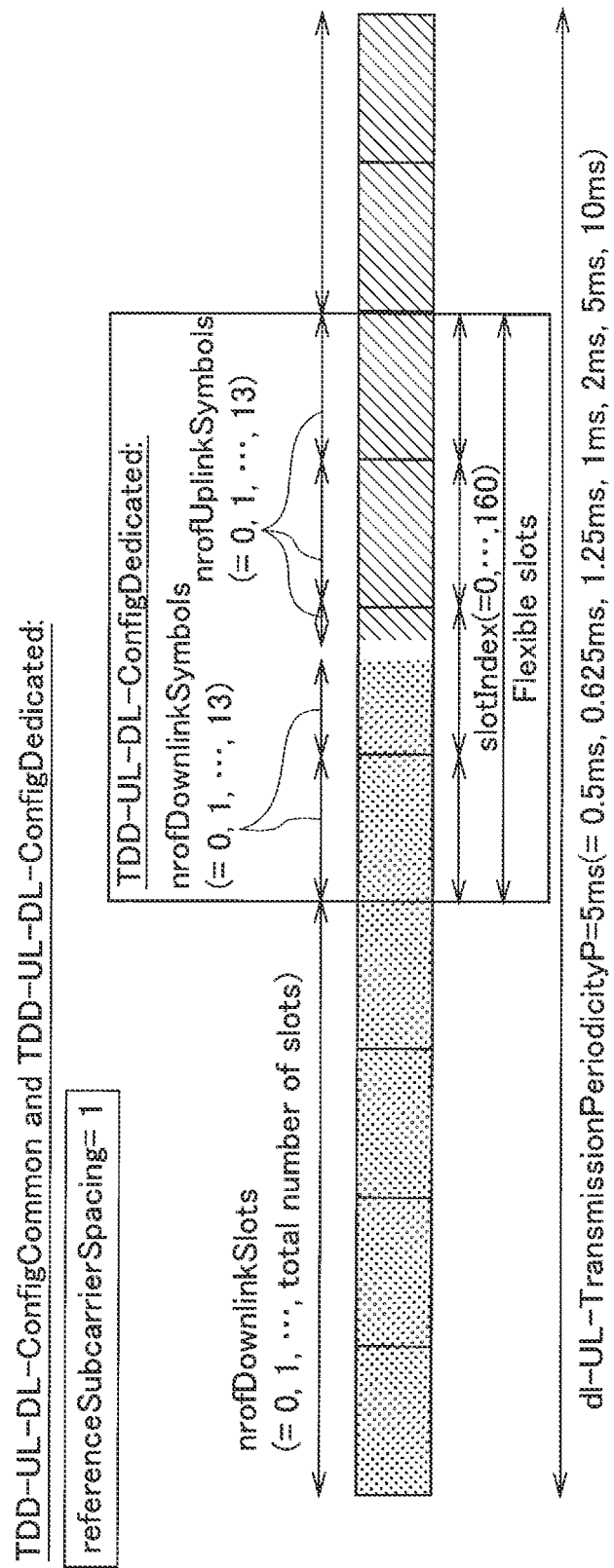
FIG. 7 is a configuration example illustrating a conventional slot pattern according to the TDD-UL-DL-ConfigCommon and TDD-UL-DL-ConfigDedicated.
Figure 9:
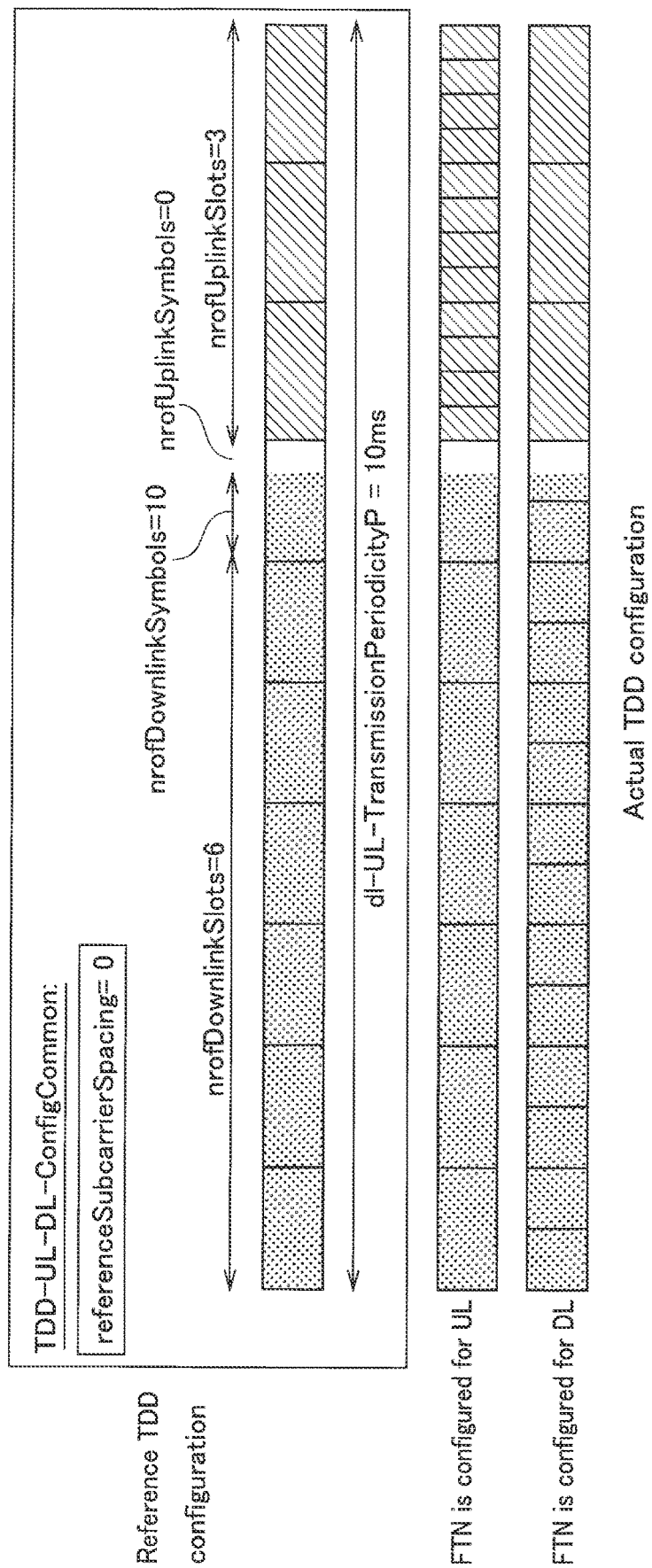
FIG. 9 is a diagram illustrating a TDD configuration example (Part 1) according to a configuration example 2-1.
Figure 10:
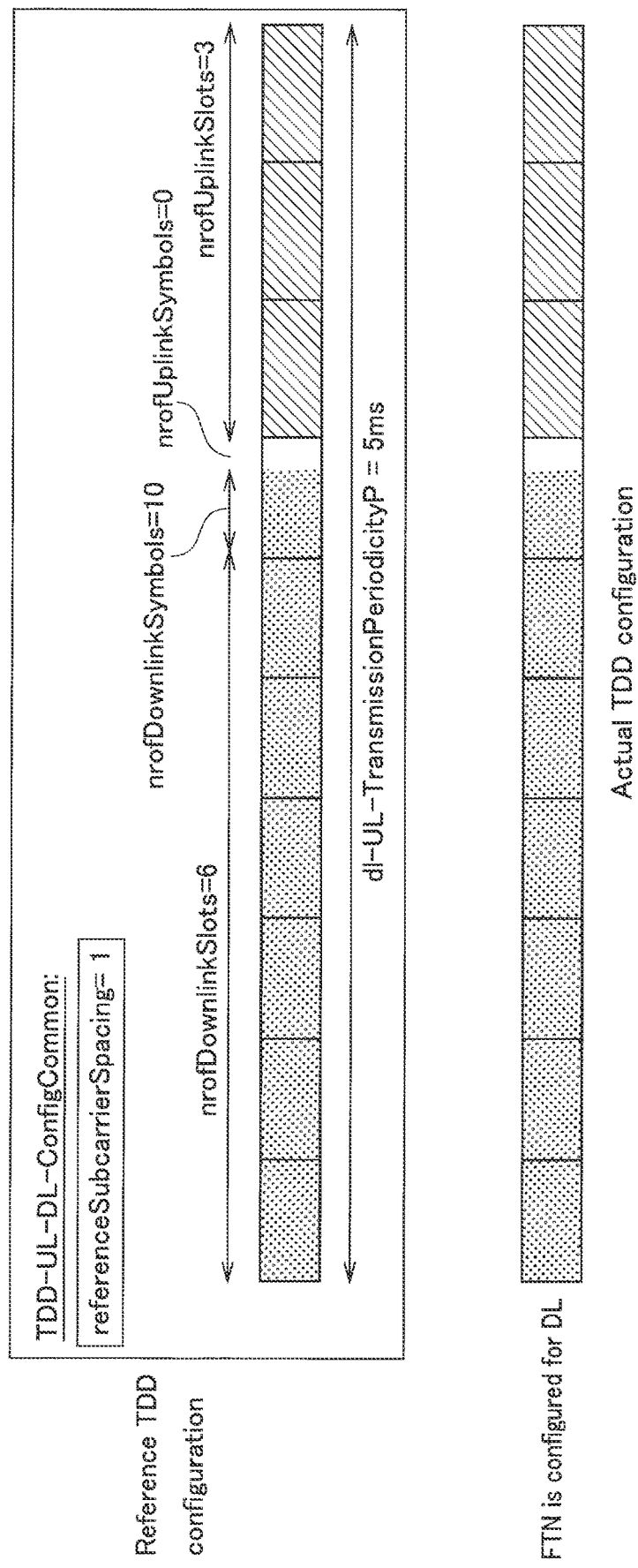
FIG. 10 is a diagram illustrating a TDD configuration example (Part 2) according to the configuration example 2-1.
Figure 11:
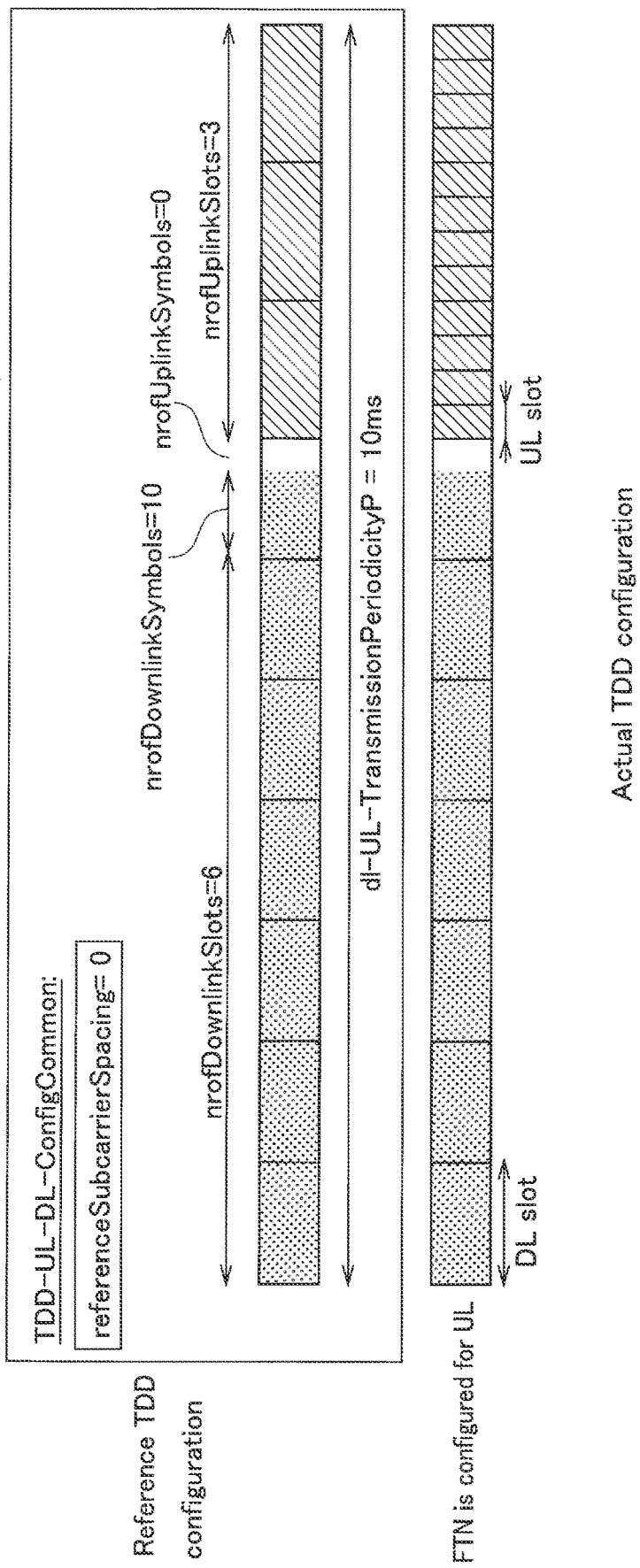
FIG. 11 is a diagram illustrating a TDD configuration example (Part 3) according to the configuration example 2-1.
Figure 12:
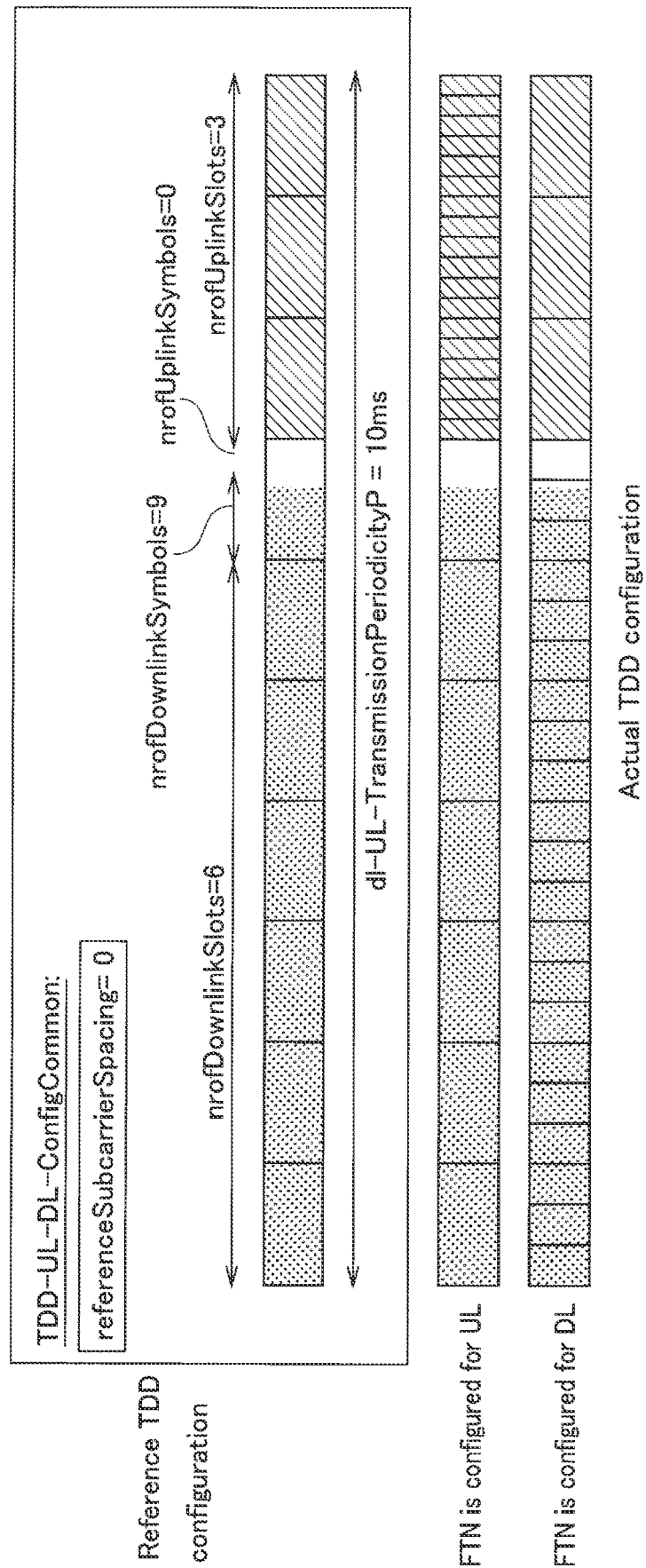
FIG. 12 is a diagram illustrating a TDD configuration example (Part 4) according to the configuration example 2-1.
Figure 13:
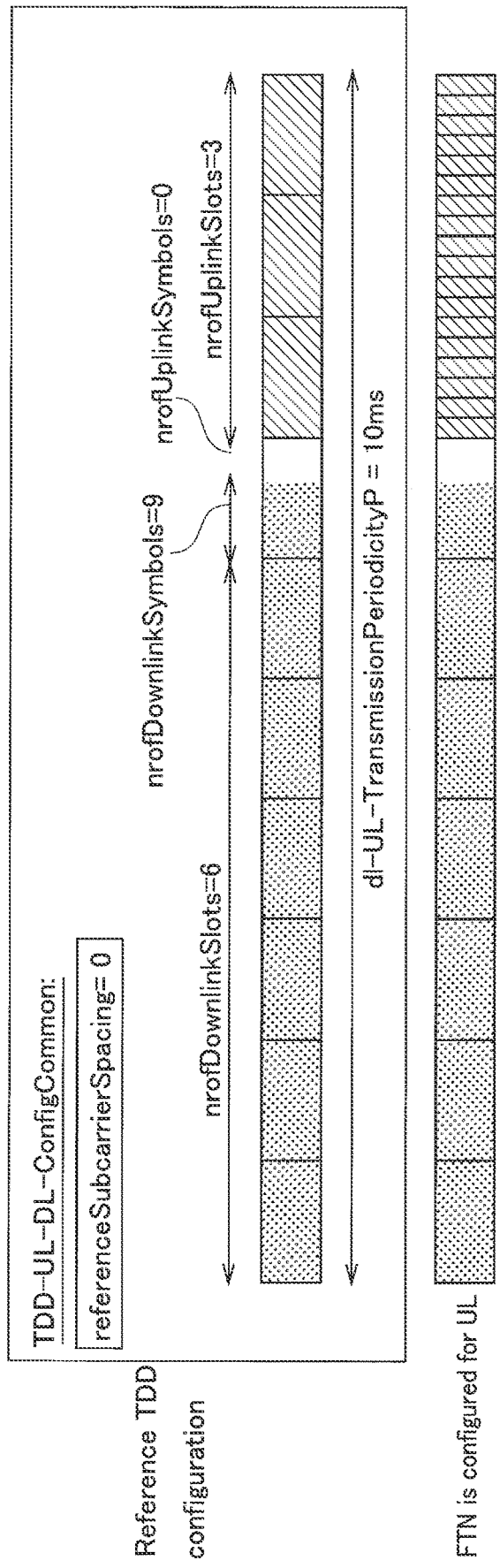
FIG. 13 is a diagram illustrating a TDD configuration example (Part 5) according to the configuration example 2-1.
Figure 14:
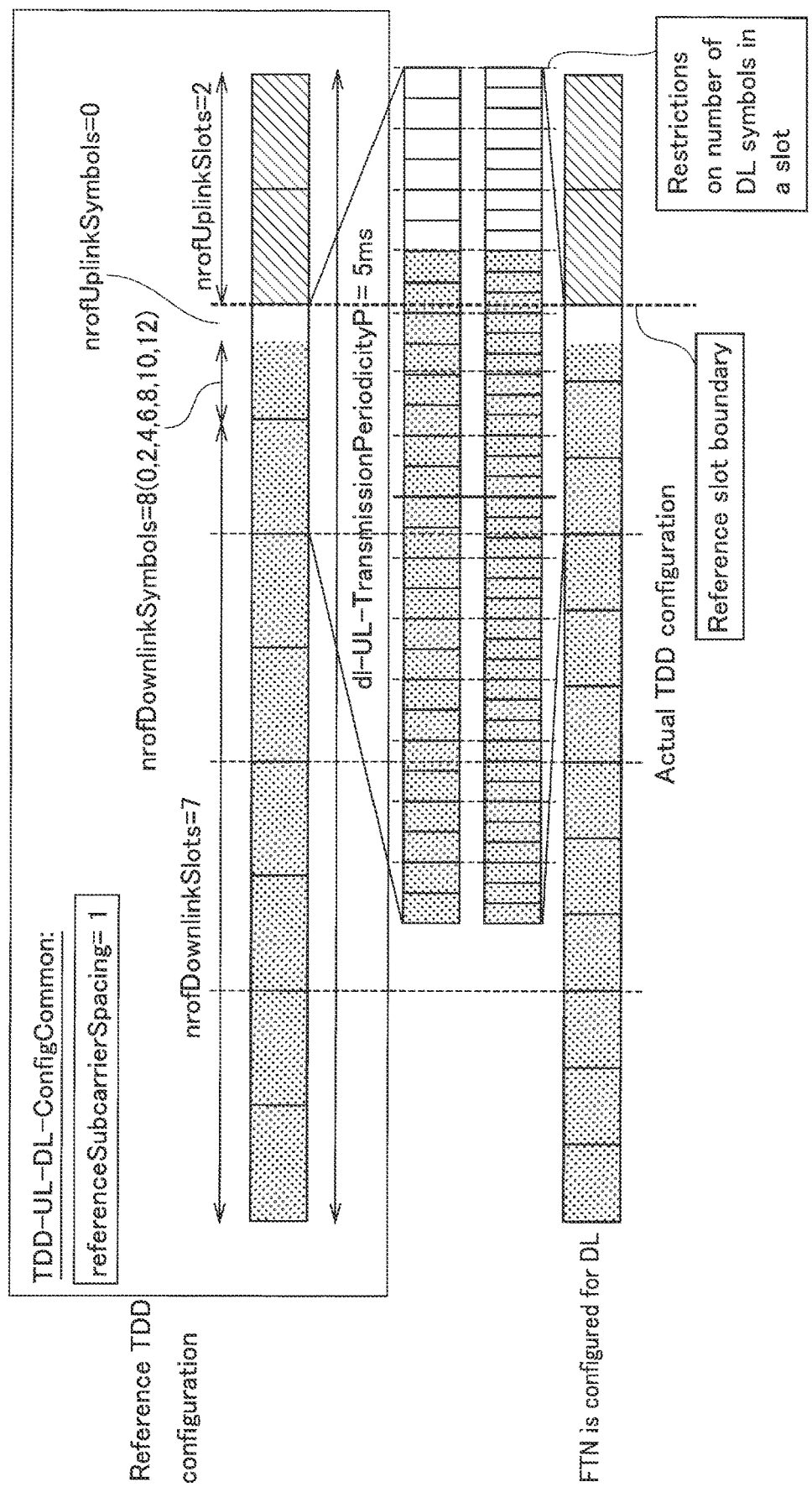
FIG. 14 is a diagram illustrating a TDD configuration example (Part 1) according to a configuration example 2-2.

Specifically, the TDD-UL-DL-ConfigCommon can provide the following contents.
  reference SCS configuration by referenceSubcarrierSpacing
  slot setting period in P milliseconds according to dl-UL-TransmissionPeriodicity
  the number of slots $d_{slots}$ having only the DL symbol according to nrofDownlinkSlots
  the number of DL symbols $d_{sym}$ according to nrofDownlinkSymbols
  the number of slots $u_{slots}$ having only the DL symbol according to nrofUplinkSlots
  the number of UL symbols $u_{sym}$ according to nrofUplinkSymbols
Moreover, pattern 2 can provide the following contents.
  slot setting period in $P_2$ milliseconds according to dl-UL-TransmissionPeriodicity
  the number of slots $d_{slots,2}$ having only the DL symbol according to nrofDownlinkSlots
  the number of DL symbols $d_{sym,2}$ according to nrofDownlinkSymbols
  the number of slots $u_{slots,2}$ having only the DL symbol according to nrofUplinkSlots
  the number of UL symbols $u_{sym,2}$ according to nrofUplinkSymbols By using the TDD-UL-DL-ConfigDedicated, it is possible to set separately for a specific slot. FIG. 7 is a configuration example of a conventional slot pattern according to the TDD-UL-DL-configCommon and TDD-UL-DL-ConfigDedicated. Moreover, FIG. 8 is a diagram showing a conventional signaling example (RRC) of the TDD-UL-DL-ConfigDedicated.

The TDD-UL-DL-ConfigDedicated can provide contents such as the following.
  a set of slot configurations according to slotSpecificConfigurationsToAddModList
  a configuration of each slot according to a set of slot configurations (specifically, as follows)
  a slot index provided by slotIndex
  a set of symbols for slot according to symbols
Moreover, the symbols can be defined as follows.
  in a case of symbol=allDownlink, all symbols in the slot are for the DL
  in a case of symbols=allUplink, all symbols in the slot are for the UL
  in a case of symbols=explicit, the nrofDownlinkSymbols provide the first symbol of some DLs in the slot, and the urofUplinkSymbols provide the last symbol of some ULs in the slot. In a case in which, the nrofDownlinkSymbols are not provided, the first symbol of some DLs in the slot does not exist, and in a case in which, the nrofUplinkSymbols are not provided, the last symbol of some ULs in the slot does not exist.

(3.2) Issues

In a case in which, the FTN is applied, as mentioned above, since the OFDM symbol is squeezed in the time domain, a structure of the radio frame (frame structure) can differ at the time of applying the FTN and not applying the FTM.
  Specifically, the following two cases are assumed.
    the slot is stipulated on the basis of the number of OFDM symbols (the slot length becomes short when the FTN is applied)
    the slot is stipulated on the basis of an absolute time length for specific numerology (the number of symbols in the slot increases when the FTN is applied)
  In each of such two cases, the frame structure can be classified into the following three categories.
    (category 1): both the slot boundaries and the symbol boundaries are aligned for the frame structure at the time when the FTN is not applied
    (category 2): the slot boundaries are aligned for the frame structure at the time when the FTN is not applied, but the symbol boundaries are not aligned.
    (category 3): both the slot boundaries and the symbol boundaries are not aligned for the frame structure at the time when the FTN is not applied Note that "the slot boundaries are aligned" signifies that one DL slot period is same as one or a plurality of UL slot periods (in a case of applying the FTN to the UL), or one UL slot period is same as one or a plurality of DL slot periods (in a case of applying the FTN to the DL).

Moreover, "the symbol boundaries are aligned" signifies that one DL symbol period is same as one or a plurality of UL symbol periods (in a case of applying the FTN to the UL), or one UL symbol period is same as one or a plurality of DL symbol periods (in a case of applying the FTN to the DL).

The definition of slot, and whether or not the slot boundaries and the symbol boundaries are aligned according to restriction of the FTN modulation factor to be applied can be summed up as in the following table.

TABLE 2

| FRAME STRUCTURE | FTN MODULATION FACTOR | | SLOT BOUNDARY ALIGNMENT | SYMBOL BOUNDARY ALIGNMENT |
|---|---|---|---|---|
| SLOT IS DEFINED ON BASIS OF NUMBER OF SYMBOLS | OPTION 1-1 | $1/2^n$ | Yes | Yes |
| | OPTION 1-2 | $1/N$ | Yes: WHEN UL SCS IS SAME AS DL SOS No: WHEN UL SCS IS DIFFERENT FROM DL SCS | Yes: WHEN UL SCS IS SAME AS DL SCS No: WHEN UL SCS IS DIFFERENT FROM DL SCS |
| | OPTION 1-3 | $M/2^n$ | No | No |
| | OPTION 1-4 | $M/N$ | No | No |

TABLE 2-continued

| FRAME STRUCTURE | | FTN MODULATION FACTOR | SLOT BOUNDARY ALIGNMENT | SYMBOL BOUNDARY ALIGNMENT |
|---|---|---|---|---|
| SLOT IS DEFINED ON BASIS OF ABSOLUTE TIME FOR SPECIFIC NUMEROLOGY | OPTION 2-1 | $1/2^n$ | Yes | Yes |
| | OPTION 2-2 | 1/N | Yes | Yes: WHEN UL SCS IS SAME AS DL SCS No: WHEN UL SCS IS DIFFERENT FROM DL SCS |
| | OPTION 2-3 | NUMBER OF DL SYMBOLS OF DL SLOT/NUMBER OF UL SYMBOLS OF UL SLOT | Yes | No |

Note that n, M, and N in the table may be selected from a number of sets of integers. Based on the content summed up shown in Table 2, the alignment of the slot boundaries and the symbol boundaries can be divided in to the following cases.
- (case 1): the slot is defined on the basis of the number of symbols
- (case 1-1): both the slot boundaries and the symbol boundaries are aligned
- (case 1-2): both the slot boundaries and the symbol boundaries are not aligned
- (case 2): the slot is defined on the basis of the absolute time length for specific numerology
- (case 2-1): both the slot boundaries and the symbol boundaries are aligned
- (case 2-2): the slot boundaries are aligned but the symbol boundaries are not aligned In such manner, since the frame structure (the alignment of the slot boundaries and the symbol boundaries) may vary in the respective cases, in a case in which the FTN is applied, it is necessary to assume an appropriate frame structure for the terminal (UE 200). Moreover, it is necessary that the network appropriately notifies the frame structure to the terminal.

(3.3) Configuration Examples

Configuration examples of the frame structure that can solve the abovementioned issues will be explained below. Note that, although use of a high-frequency band surpassing 52.6 GHz, or specifically, FR4 is assumed, it is not necessarily restricted to the aforementioned frequency range.

(3.3.1) Configuration Example 1

In the present configuration example, the reference subcarrier spacing (Reference SCS) is determined by any of the following options.
- (option 1): irrespective of whether or not the FTN has been applied, the smallest SCS among the DL/UL BWP (Bandwidth part) that has been set, is selected for the Reference SCS Option 1 is similar to Release 15. As a setting $u_{ref}$ of the Reference SCS for the terminal, an SCS same as or smaller than any SCS configuration u for DU/UL BWP that has been set is to be anticipated.
- (option 2): the Reference SCS is selected according to the application of the FTN Specifically, in a case in which the FTN has not been set, or has been disabled, as the configuration $u_{ref}$ of the Reference SCS for the terminal, an SCS same as or smaller than any SCS configuration u for DU/UL BWP that has been set is to be anticipated.

In a case in which the FTN has been set, or has been enabled, as the configuration $u_{ref}$ of the Reference SCS for the terminal, an SCS same as or smaller than any equivalent SCS configuration $u_{equi}$ for the DU/UL BWP that has been set is to be anticipated.

It is possible to express $u_{equi}$ by the following expression.

$$u_{equi} = \{u - \lfloor \log_2 \alpha \rfloor\}$$

In such manner, the equivalent SCS is defined by an expression using FTN demodulation factor α. For instance, in a case in which α is 0.5 or more, but less than 1, it is calculated as u+1, and in a case in which α is 0.25 or more than 0.25 but less than 0.5, it is calculated as u+2. In a case in which the FTN has not been set, $u_{equi}$ is deemed as uequi=u.

Moreover, in a case in which FTN demodulation factor α is let to be α=X/Y, it is possible to perform mapping of the slot pattern from a reference TDD configuration (Reference TDD configuration) to an actual TDD configuration on the basis of the following contents.

in a case in which the FTN is applied to the DL
- Each X slot provided by pattern 1 or pattern 2 is applied to the actual DL slot, $Y*2^{(u-u_{ref})}$ portions ($Y*2^{(u-u_{ref})}$ portions of the actual DL slot). Here, the first slot starts simultaneously with the first slot of $u_{ref}$, and each of X number of DL or FL symbols of $u_{ref}$ corresponds to $Y*2^{(u-u_{ref})}$ number of consecutive DL or FL symbols for the aforementioned configuration of the Reference SCS.
- Each slot provided by pattern 1 or pattern 2 is applied to the actual UL slot, $2^{(u-u_{ref})}$ portions. Here, the first slot starts simultaneously with the first slot of the $u_{ref}$, and each UL or FL symbol of $u_{ref}$ corresponds to the $2^{(u-u_{ref})}$ consecutive UL or FL symbols for the aforementioned configuration of Reference SCS.

Case in which the FTN is applied to the UL
- Each slot provided by pattern 1 or pattern 2 is applied to the actual DL slot, $2^{(u-u_{ref})}$ portions. Here, the first slot starts simultaneously with the first slot of $u_{ref}$, and each DL or FL symbol of $u_{ref}$ corresponds to $2^{(u-u_{ref})}$ number of consecutive DL or FL symbols for the aforementioned configuration of Reference SCS.
- Each X slot provided by pattern 1 or pattern 2 is applied to the actual UL slot, $Y*2^{(u-u_{ref})}$ portions. Here, the first slot starts simultaneously with the first slot of $u_{ref}$, and each of X number of UL or FL symbols of $u_{ref}$ corresponds to $Y*2^{(u-u_{ref})}$ number of consecutive UL or FL symbols for the aforementioned configuration of the Reference SCS.

In a case in which the FTN is applied to the DL, X slot portions of the DL notified by pattern 1 or pattern 2 are applied to the actual DL slot $Y*2^{(u-u_{ref})}$ portions. The X number of Dl or FL symbols correspond to $Y*2^{(u-u_{ref})}$ number of UL or $Y*2^{(u-u_{ref})}$.

Moreover, the UL 1 slot portions (slot portions of the UL 1) notified by pattern 1 or pattern 2 correspond to $2^{(u-u_{ref})}$ portions of UL slots. Note that, in a case in which the FTN is applied to the UL, mapping of a slot pattern opposite to the abovementioned contents is applied to the UL and the DL.

For instance, in a case in which the DL SCS is 30 kHz (u=1) and the UL SCS is 60 kHz (u=2), in option 1, the Reference SCS becomes 30 kHz ($u_{ref}=1$), and at this time (in this case), the TDD setting is notified to be equivalent to 30 kHz SCS.

In the DL, when it is assumed that the FTN of $\alpha=\frac{1}{2}$ is applied, since it becomes equivalent to 60 kHz SCS, DL X=1 slot portions notified by the TDD pattern (TDD-UL-DL-ConfigCommon) is equivalent to $Y*2^{(u-u_{ref})}=2$ slot portions. Moreover, the UL 1 slot portions are equivalent to $2^{(u-u_{ref})}=2$ slot portions.

In the UL, when it is assumed that the FTN of $\alpha=\frac{1}{2}$ is applied, the UL is equivalent to 120 kHz SCS. The DL 1 slot portions notified by the TDD pattern are equivalent to $2^{(u-u_{ref})}=1$ slot portion. Moreover, the UL X=1 slot portion is equivalent to $Y*2^{(u-u_{ref})}=4$ slot portions.

Whereas, in option 2, in the DL, when it is assumed that the FTN of $\alpha=\frac{1}{2}$ is applied, the equivalent SCS ($u_{equi}$) of the DL becomes 60 kHz, and the Reference SCS becomes 60 kHz ($u_{ref}=2$), and at this time, the TDD configuration is notified to be equivalent to 60 kHz. The DL X=1 slot portion notified by the TDD pattern is equivalent to $Y*2^{(u-u_{ref})}=1$ slot portion. Moreover, the UL 1 slot portions are equivalent to $2^{(u-u_{ref})}=1$ slot portion.

In the UL, when it is assumed that the FTN of $\alpha=\frac{1}{2}$ is applied, the equivalent SCS of the UL becomes 120 kHz, and the Reference SCS becomes 30 kHz ($u_{ref}=1$). At this time, the TDD configuration is notified to be equivalent to 30 kHz SCS. The DL 1 slot portion notified by the TDD pattern is equivalent to $2^{(u-u_{ref})}=1$ slot portion. Moreover, the UL X=1 slot portion is equivalent to $Y*2^{(u-u_{ref})}=4$ slot portions.

(3.3.2) Configuration Example 2

A specific TDD setting at the time of applying the FTN based on the abovementioned configuration example 1 will be explained below. In the present configuration example, an arrangement is made such that a UE-specific TDD configuration and a cell-specific TDD configuration are applicable as a semi-static TDD configuration even at the time of FTN operation.

Specifically, the TDD-UL-DL-ConfigCommon and the TDD-UL-DL-ConfigDedicated are used.

(3.3.2.1) Configuration Example 2-1

The present configuration example is for the abovementioned case 1-1 (the slot is defined on the basis of the number of symbols, and both the slot boundaries and the symbol boundaries are aligned). In the present configuration example, parameters of Release 15 are reused.

Moreover, the range of values of maxNrofSlots may be let to be configurable to be 320 or more. For instance, in a case of supporting a case in which the equivalent SCS after the FTN application becomes larger than 240 kHz, the value of maxNrofSlots may be extended to a value such as 640. In a case in which the maximum subcarrier spacing that is supported is $u_{max}$, the maximum number of slots that is supported becomes $10*2^{u_{max}}$.

FIGS. 9 to 13 show TDD configuration examples according to the configuration example 2-1. Specifically, FIGS. 9 to 13 show a TDD configuration that becomes a reference (Reference TDD configuration) based on the TDD-UL-DL-ConfigCommon, and an actual TDD configuration (Actual TDD configuration) based on an option of the abovementioned configuration example 1. As shown in FIGS. 9 to 13, the number of slots or the number of symbols forming the actual TDD configuration can differ according to at least one of the DL SCS, the UL SCS, the Reference SCS, and the FTN modulation factor $\alpha$.

The TDD configuration examples shown in FIGS. 9 to 13 have the following points in common.

14 symbol/slot configuration

DL SCS=15 kHz, UL SCS=30 kHz

Whereas, the TDD configuration examples shown in FIGS. 9 to 13 differ at the following points.

(FIG. 9)
the Reference SCS is selected on the basis of option 1, and is 15 kHz (0)
$\alpha=\frac{1}{2}^n$, n=1
FTN configuration is possible for the UL and the DL (FIG. 10)
the Reference SCS is selected on the basis of option 2, and is 30 kHz (1)
$\alpha=\frac{1}{2}^n$, n=1
FTN configuration is possible for the DL (FIG. 11)
the Reference SCS is selected on the basis of option 2, and is 15 kHz (0)
$\alpha=\frac{1}{2}^n$, n=1
FTN configuration is possible for the UL (FIG. 12)
the Reference SCS is selected on the basis of option 1, and is 15 kHz (0)
$\alpha=1/N$, N=3
FTN configuration is possible for the UL and the DL (FIG. 13)
the Reference SCS is selected on the basis of option 2, and is 15 kHz
$\alpha=1/N$, N=3
FTN configuration is possible for the UL (3.3.2.1) Configuration Example 2-2

The present configuration example is for the abovementioned case 1 (the slot is defined on the basis of the number of symbols), and specifically case 1-1 (both the slot boundaries and the symbol boundaries are aligned), and case 1-2 (both the slot boundaries and the symbol boundaries are not aligned). Mainly contents differing from the setting 2-1 will be explained below.

In the present configuration example, an additional parameter is introduced to the TDD-UL-DL-ConfigCommon. Specifically, a reference slot boundary (Reference slot boundary) is added. Moreover, the range of maxNrofSlots may be extended.

The reference slot boundary is defined as a location at which the slot boundaries coincide between the DL and the UL. Specifically, the Reference slot boundary can be defined by one of the following.

(definition 1): defined as a ratio of the number of DL slots and the number of UL slots in a DL/UL switchover cycle (definition 2): defined as the number of DL slots in the DL/UL switchover cycle (definition 3): defined as the number of UL slots in the DL/UL switchover cycle Note that, a slot prior to the Reference slot boundary may be let to be DL or FL, and a slot subsequent to the Reference slot boundary may be let to be UL or FL.

The FL slot/symbol prior to the Reference slot boundary may be overwritten by a DL channel/signal, but is not overwritten by a UL channel/signal. The FL slot/symbol subsequent to the Reference slot boundary may be overwritten by a UL channel/signal, but is not overwritten by a DL channel/signal.

Moreover, the following constraints may be stipulated for the Reference slot boundary.

in a case in which the FTN is applied to the DL, the Reference slot boundary is made to match with a DL slot boundary in a case in which the FTN is applied to the UL, the Reference slot boundary is made to match with a UL slot boundary Moreover, the following constraints may be stipulated for the number of symbols in a slot.

in a case in which the FTN is applied to the DL, the last DL symbol in the Reference TDD configuration is let to match with a DL symbol boundary for a DL BWP that has been set in a case in which the FTN is applied to the UL, the first UL symbol in the Reference TDD configuration is let to match with a UL symbol boundary for a UL BWP that has been set FIGS. 14 to 17 show TDD configuration examples according to the configuration example 2-2. Specifically, FIGS. 14 to 17 show a TDD configuration that becomes a reference (Reference TDD configuration) based on the TDD-UL-DL-ConfigCommon, and an actual TDD configuration (Actual TDD configuration) to which the Reference slot boundary has been added.

The TDD configuration examples shown in FIGS. 14 to 17 have the following points in common.

14 symbol/slot configuration

DL SCS=15 kHz, UL SCS=30 kHz

Whereas, the TDD configuration examples shown in FIGS. 14 to 17 differ at the following points.

(FIG. 14)

the Reference SCS is selected on the basis of option 2, and is 30 kHz (0)

α=2/N, N=3

Figure 15:
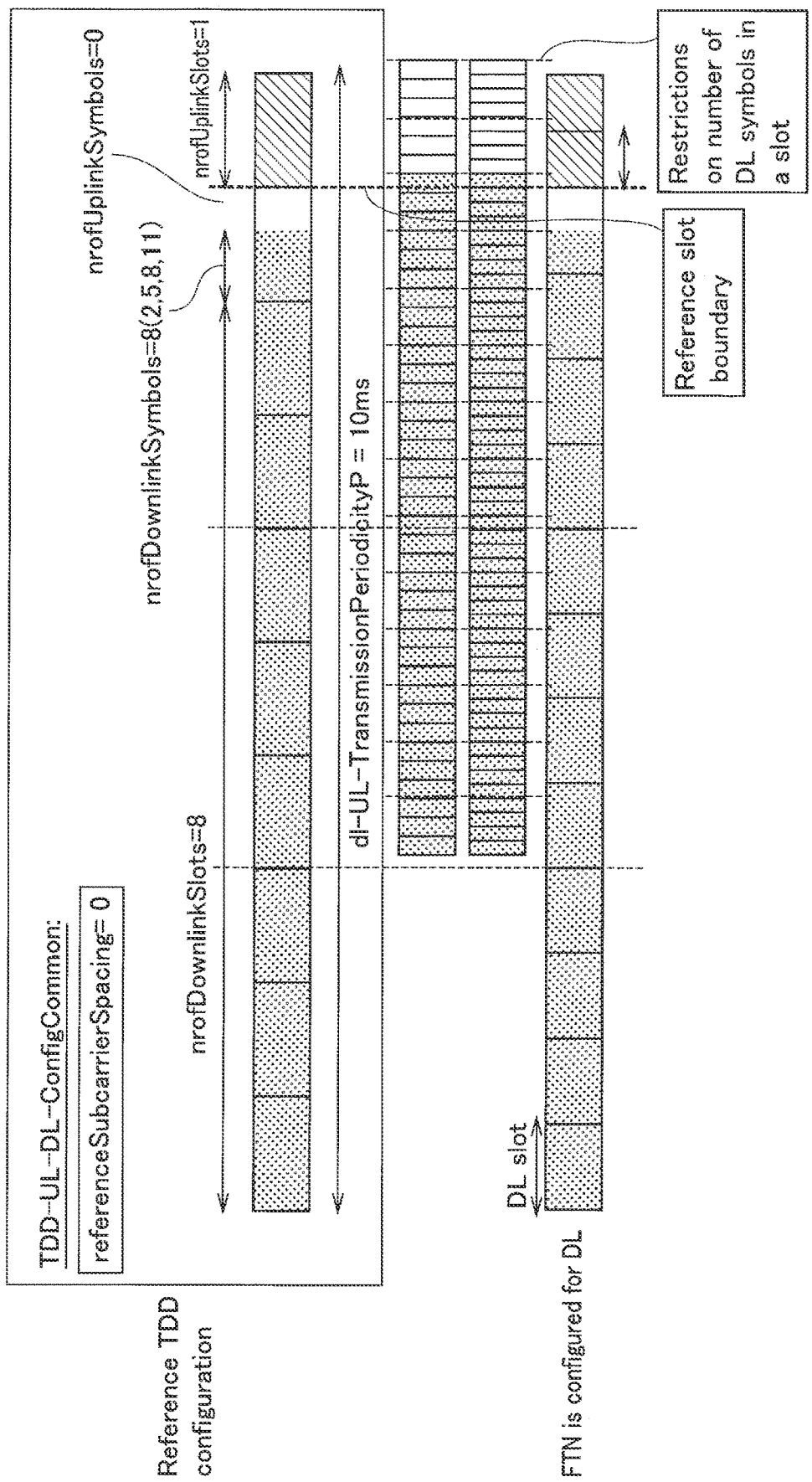
FIG. 15 is a diagram illustrating a TDD configuration example (Part 2) according to the configuration example 2-2.

FTN configuration is possible for the DL (FIG. 15)

the Reference SCS is selected on the basis of options 1 and 2, and is 15 kHz (0)

α=M/$2^n$, n=2, M=3

Figure 16:
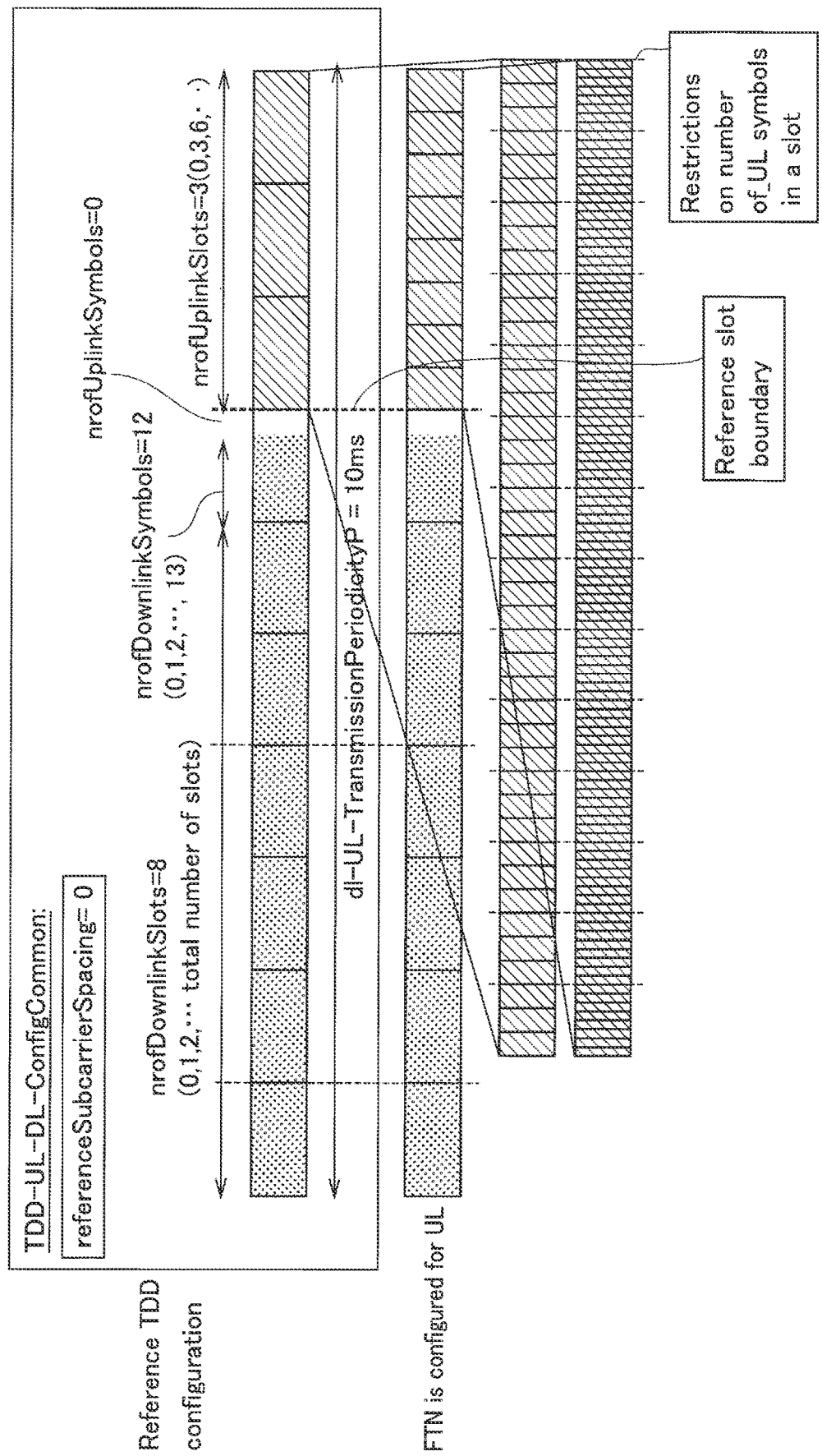
FIG. 16 is a diagram illustrating a TDD configuration example (Part 3) according to the configuration example 2-2.

FTN configuration is possible for the DL (FIG. 16)

the Reference SCS is selected on the basis of options 1 and 2, and is 15 kHz (0)

α=M/$2^n$, n=2, M=3

Figure 17:
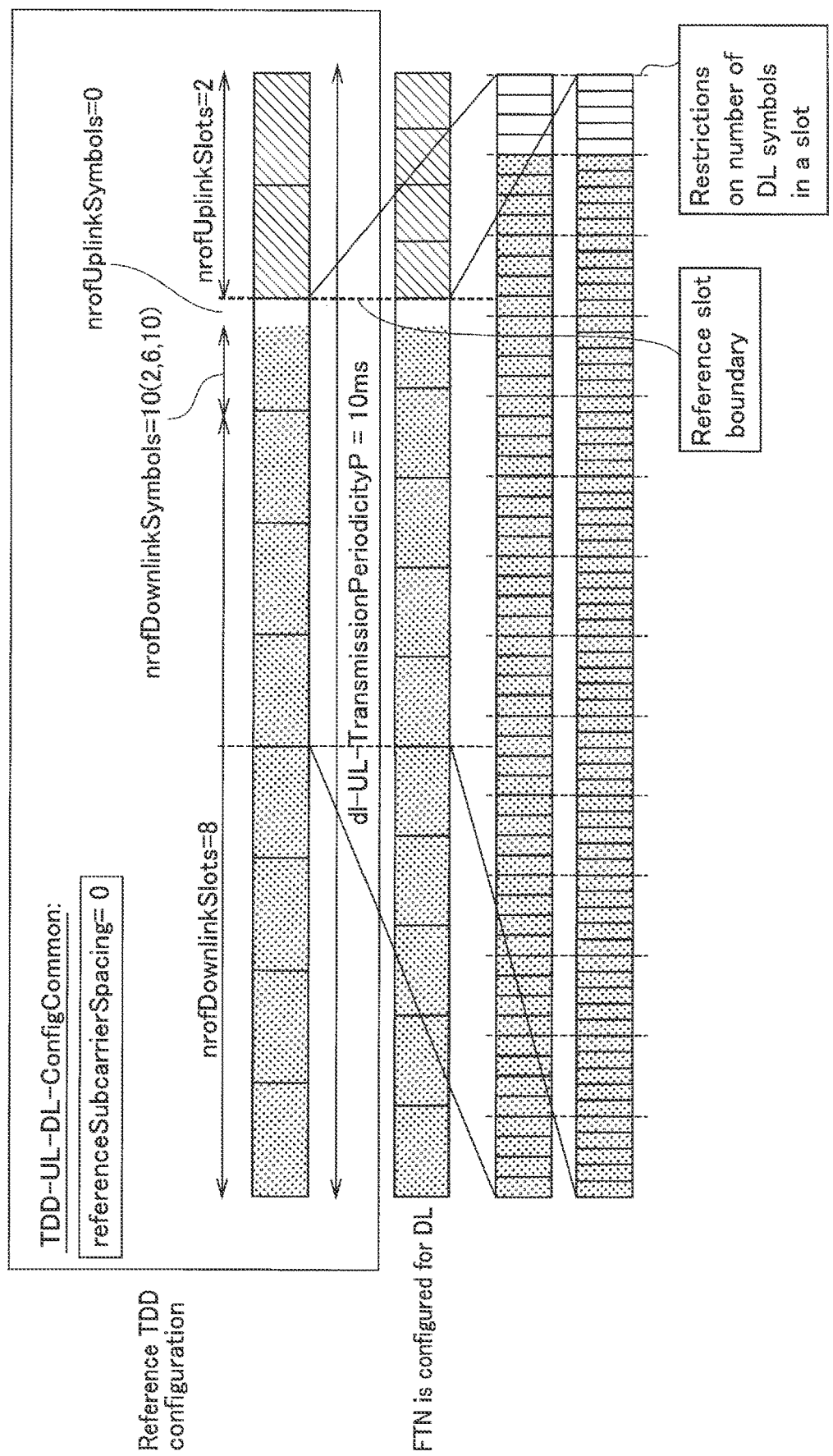
FIG. 17 is a diagram illustrating a TDD configuration example (Part 4) according to the configuration example 2-2.

FTN configuration is possible for the UL (FIG. 17)

the Reference SCS is selected on the basis of options 1 and 2, and is 15 kHz (0)

α=M/N, N=5, M=4

FTN configuration is possible for the DL

Note that, since the number (0, 2, 4, 6, 8, 10, 12 and the like) indicated together with nrofDownlinkSymbols satisfies the abovementioned constraints related to the number of symbols in the slot, the number indicates a value that may be taken as the number of DL symbols included in a slot, in the corresponding domain based on the configuration example in each diagram.

(3.3.2.3) Configuration Example 2-3

The present configuration example is for the abovementioned case 2-1 (the slot is defined on the basis of the absolute time length for a specific numerology, and both the slot boundaries and the symbol boundaries are aligned). In the present configuration example, in the TDD-UL-DL-ConfigCommon and the TDD-UL-DL-ConfigDedicated, the following constraints may be stipulated while reusing the parameters of Release 15.

to increase the maxNrofSlots to increase the maxNrofSymbols (in a case of determining the slot length according to $u_{ref}$ as determined conventionally, up to $14*X*2^{u_{ref}}$ number of symbols become necessary)

Note that, the maxNrofSlots is the maximum number of slots included in a radio frame (10 ms), and the maxNrofSymbols is the maximum number of symbols included in a slot (refer to 3GPP TS38.331)

As shown in Table 3, regarding the dl-UL-TransmissionPeriodicity, it is possible to set only a value such as an integral multiple of the slot length. That is, regarding the dl-UL-TransmissionPeriodicity, a value is let to be such that it is divisible by the absolute time length of the slot.

TABLE 3

| Slot | dl-UL-TransmissionPeriodicity (ms) | | | | | | | | | |
|---|---|---|---|---|---|---|---|---|---|---|
| | 0.5 | 0.625 | 1 | 1.25 | 2 | 2.5 | 3 | 4 | 5 | 10 |
| 1 ms | x | x | ✓ | x | ✓ | x | ✓ | ✓ | ✓ | ✓ |
| 0.5 ms | ✓ | x | ✓ | x | ✓ | ✓ | ✓ | ✓ | ✓ | ✓ |
| 0.25 ms | ✓ | x | ✓ | ✓ | ✓ | ✓ | ✓ | ✓ | ✓ | ✓ |
| 0.125 ms | ✓ | ✓ | ✓ | ✓ | ✓ | ✓ | ✓ | ✓ | ✓ | ✓ |

Note that the dl-UL-TransmissionPeriodicity is a periodicity of the DL-UL pattern (slot format) stipulated in 3GPP TS38.213.

Figure 18:
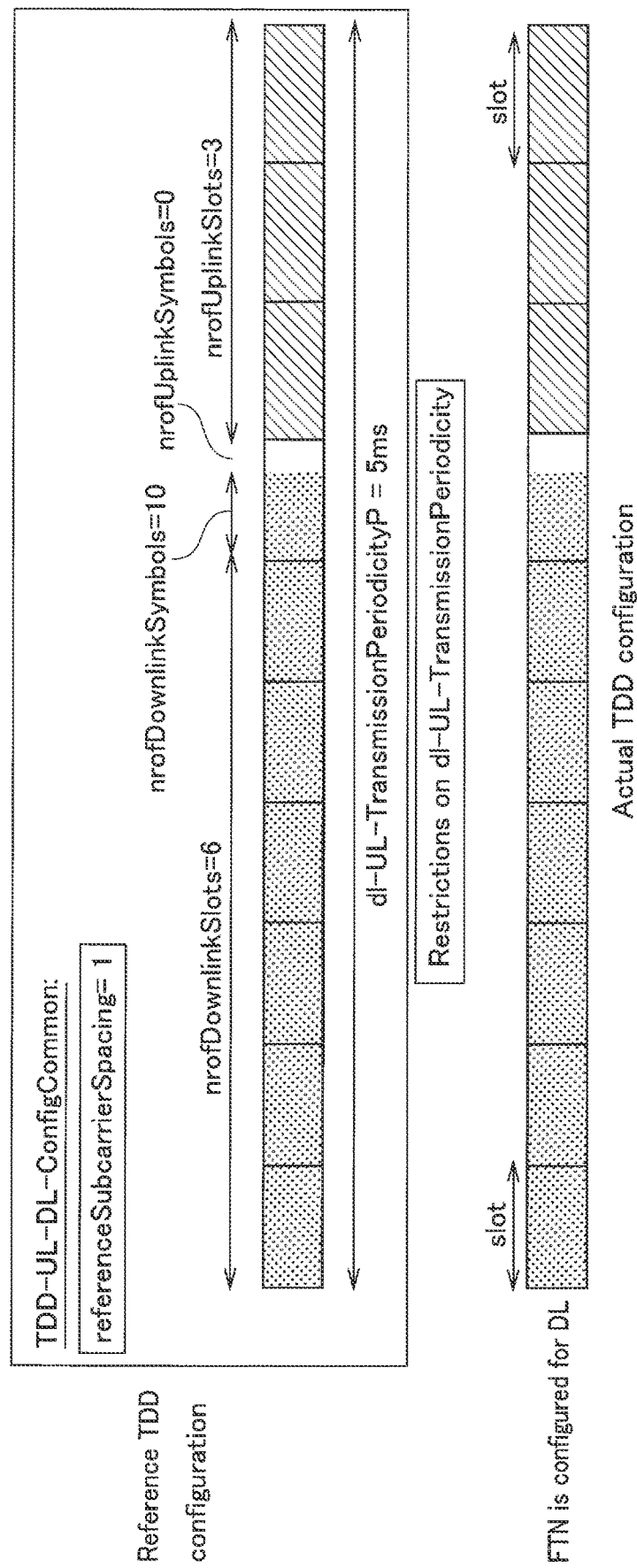
FIG. 18 is a diagram illustrating a TDD configuration example according to a configuration example 2-3.

FIG. 18 shows a TDD configuration example according to the configuration example 2-3. Specifically, FIG. 18 shows a TDD configuration which becomes a reference (Reference TDD configuration) based on the TDD-UL-DL-ConfigCommon and an actual TDD configuration (Actual TDD configuration) to which a constraint of dl-UL-TransmissionPeriodicity has been added.

The TDD configuration example shown in FIG. 18 is in accordance with the following contents.

14 symbol/slot configuration

DL SCS=15 kHz, UL SCS=30 kHz the Reference SCS is selected on the basis of option 2, and is 30 kHz (0)

the slot is defined on the basis of an absolute time according to the dl-UL-TransmissionPeriodicity α=½$^n$, n=1

FTN configuration is possible for the DL (3.3.2.4) Configuration Example 2-4

The present configuration example is for the abovementioned case 2 (the slot is defined on the basis of the absolute time length for a specific numerology), and specifically the case 2-1 (both the slot boundaries and the symbol boundaries are aligned) and the case 2-2 (both the slot boundaries and the symbol boundaries are not aligned).

In the present configuration example, in the TDD-UL-DL-ConfigCommon and the TDD-UL-DL-ConfigDedicated, the following constraints may be stipulated while reusing the parameters of Release 15.
- to increase the maxNrofSlots
- to increase the maxNrofSymbols
- regarding the dl-UL-TransmissionPeriodicity, the value is let to be such that it is divisible by the absolute time length of the slot (that is, let to be an integral multiple) (similar to the configuration example 2-3)

Figure 19:
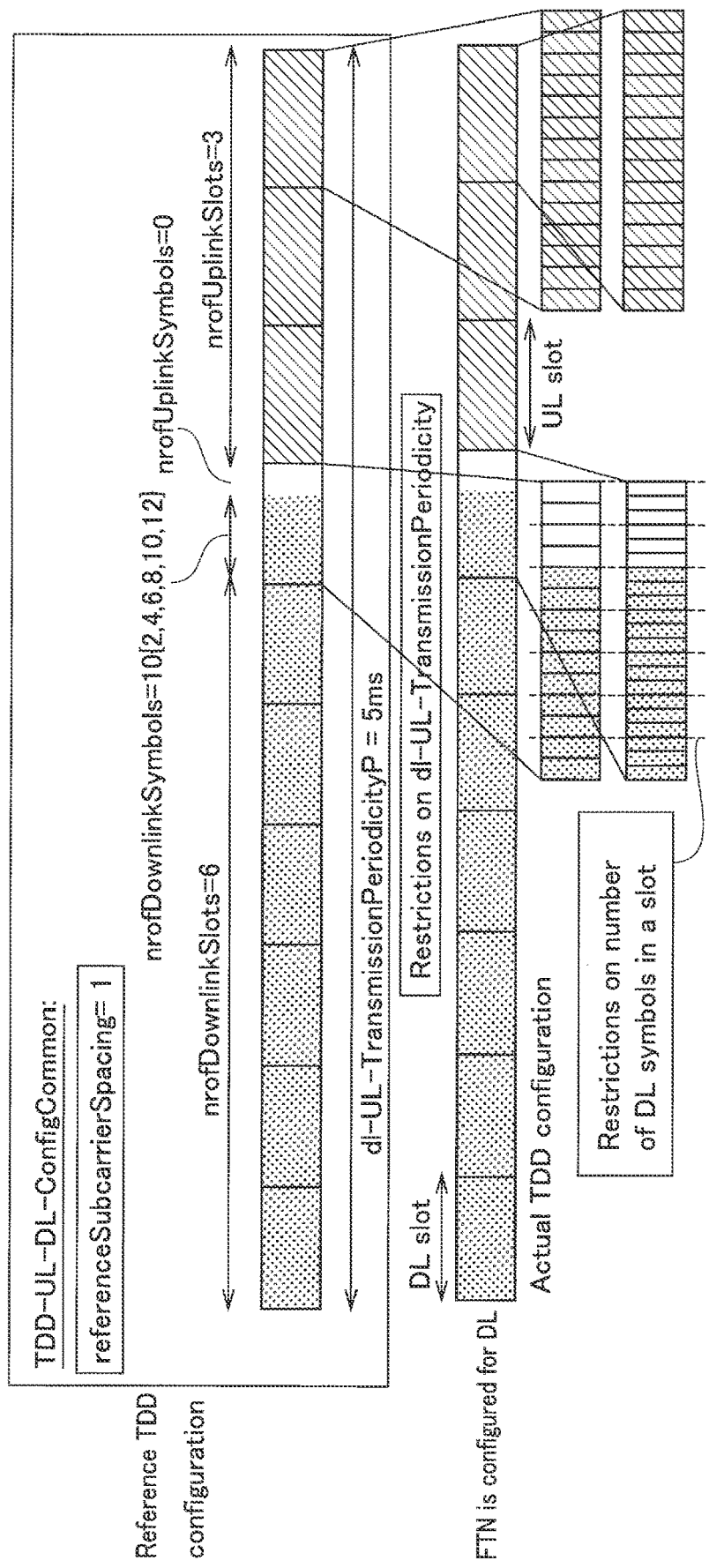
FIG. 19 is a diagram illustrating a TDD configuration example (Part 1) according to a configuration example 2-4.
Figure 20:
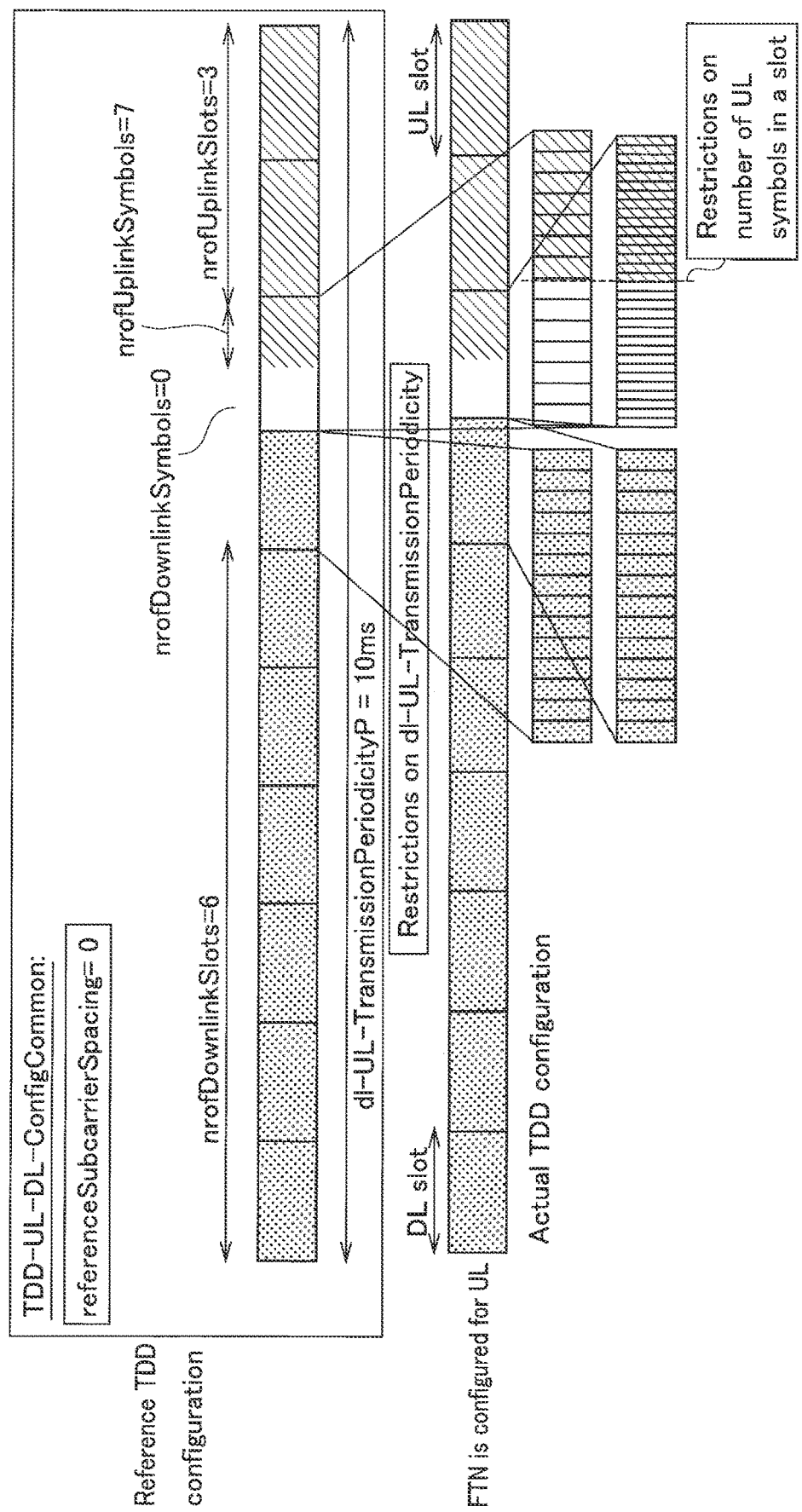
FIG. 20 is a diagram illustrating a TDD configuration example (Part 2) according to the configuration example 2-4.

Moreover, regarding the number of symbols in a slot, the following constraints may be stipulated.
- in a case in which the FTN is applied to the DL, the last DL symbol is let to match with a DL symbol boundary for DL BWP that has been set
- in a case in which the FTN is applied to the UL, the first UL symbol is let to match (coincide) with a UL symbol boundary for UL BWP that has been set FIG. 19 and FIG. 20 illustrate TDD configuration examples according to the configuration example 2-4. Specifically, FIG. 19 and FIG. 20 show a TDD configuration that becomes a reference (Reference TDD configuration) based on the TDD-UL-DL-ConfigCommon, and an actual TDD configuration (Actual TDD configuration) to which the constraint of the dl-UL-TransmissionPeriodicity has been added.

The TDD configuration examples in FIG. 19 and FIG. 20 have the following points in common.
- 14 symbol/slot configuration
- DL SCS=15 kHz, UL SCS=30 kHz
- the slot is defined on the basis of the absolute time according to the dl-UL-TransmissionPeriodicity Whereas, the TDD configuration examples shown in FIG. 19 and FIG. 20 differ at the following points.

(FIG. 19)
- the Reference SCS is selected on the basis of option 2, and is 30 kHz (0)
- α=1/N, N=3
- FTN configuration is possible for the DL (FIG. 20)
- the reference SCS is selected on the basis of option 2, and is 15 kHz (0)
- α=X/Y, X=14, Y=16 (X is the number of DL symbols included in the DL slot, and Y is the number of UL symbols included in the UL slot)
- FTN configuration is possible for the UL (3.4) Notification Example of TDD Configuration Next, a notification example of the TDD configuration according to the abovementioned configuration example 2 will be explained below. In a case in which the application of the FTN is fixed by specifications of the 3GPP, the abovementioned TDD configurations (Reference TDD configuration, Actual TDD configuration) may be set by a System Information Block (SIB) (or a Master Information Block (MIB)), or another SIB.

Whereas, in a case in which the application of the FTN can configured arbitrarily, the conventional TDD configuration (Reference TDD configuration) may be notified to the terminal (UE 200), and the TDD Configuration such as the configuration example 2 (Actual TDD configuration) may be notified by signaling of an upper layer such as the RRC.

(4) Advantageous Effects

According to the abovementioned embodiment, the following effects can be achieved. Specifically, the terminal (UE 200), even for the slot pattern that is used in a case in which the FTN is applied, is capable of applying the configuration of the UL and the DL according to the TDD by using the Reference SCS same as the slot pattern used in a case in which the FTN is not applied.

Moreover, in the present embodiment, the terminal, in a case in which the slot pattern used in the case in which the FTN is applied, for at least one of the TDD-UL-DL-ConfigCommon and the TDD-UL-DL-ConfigDedicated, is capable of applying the configuration same as the slot pattern used in the case in which the FTN is not applied. That is, even in the case in which the FTN is not applied, the TDD-UL-DL can be realized while using the contents stipulated in Release 15.

In the present embodiment, in a case of the slot pattern when the FTN is applied, the Reference SCS and the equivalent SCS can be determined on the basis of the FTN configuration, and the TDD-UL-DL can be realized.

That is, according to the present embodiment, by the application of the FTN, in the UL and the DL, even in a case in which the slot boundaries or the symbol boundaries are not aligned, the terminal can operate appropriately. That is, according to the present embodiment, even in the case in which the FTN is applied for the TDD-UL-DL, the terminal can operate appropriately.

(5) Other Embodiments

Although the contents of the present invention have been described by way of the embodiments, it is obvious to those skilled in the art that the present invention is not limited to what is written here and that various modifications and improvements thereof are possible.

For instance, according to the abovementioned embodiment, the description was made with the operation on the terminal side as an example, and as a matter of course, even the radio base station (gNB) side may also operate on the basis of the abovementioned TDD-UL-DL Moreover, in the abovementioned embodiment, particularly, a case of applying to a high frequency band such as FR4, that is, a frequency band exceeding 52.6 GHz has been described; however, at least one of the abovementioned TDD-UL-DL may be applied to other frequency range such as FR3.

Furthermore, as explained above, FR4 may be divided into a frequency range of 70 GHz or lower and a frequency range of 70 GHz or higher, and the correspondence between the proposal and the frequency range such as the abovementioned configuration example of the TDD-UL-DL is applied to the frequency range of 70 GHz and higher, and the configuration example of the TDD-UL-DL is applied partially to the frequency range of 70 GHz and lower, may be changed as deemed appropriate.

Moreover, the block diagram used for explaining the embodiments (FIG. 4) shows blocks of functional unit. Those functional blocks (structural components) can be realized by a desired combination of at least one of hardware and software. Means for realizing each functional block is not particularly limited. That is, each functional block may be realized by one device combined physically or logically.

Alternatively, two or more devices separated physically or logically may be directly or indirectly connected (for example, wired, or wireless) to each other, and each functional block may be realized by these plural devices. The functional blocks may be realized by combining software with the one device or the plural devices mentioned above.

Functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, a functional block (component) that causes transmitting may be called a transmitting unit or a transmitter. For any of the above, as explained above, the realization method is not particularly limited to any one method.

Figure 21:
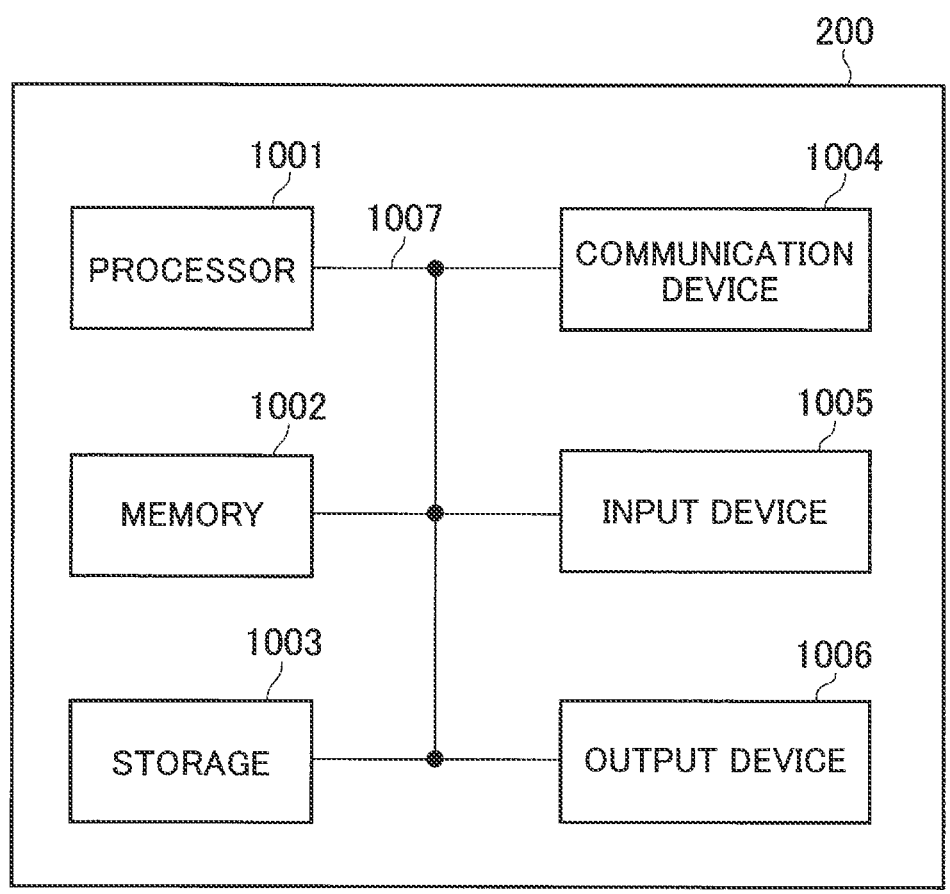
FIG. 21 is a diagram illustrating an example of a hardware configuration of the UE 200.

Furthermore, the UE 200 explained above can function as a computer that performs the processing of the radio communication method of the present disclosure. FIG. 21 is a diagram illustrating an example of a hardware configuration of the UE 200. As shown in FIG. 21, the UE 200 can be configured as a computer device including a processor 1001, a memory 1002, a storage 1003, a communication device 1004, an input device 1005, an output device 1006, a bus 1007, and the like.

Furthermore, in the following explanation, the term "device" can be replaced with a circuit, device, unit, and the like. Hardware configuration of the device can be constituted by including one or plurality of the devices shown in the figure, or can be constituted by without including a part of the devices.

The functional blocks of the UE 200 (see FIG. 4) can be realized by any of hardware elements of the computer device or a desired combination of the hardware elements.

Moreover, the processor 1001 performs computing by loading a predetermined software (computer program) on hardware such as the processor 1001 and the memory 1002, and realizes various functions of the UE 200 by controlling communication via the communication device 1004, and controlling reading and/or writing of data on the memory 1002 and the storage 1003.

The processor 1001, for example, operates an operating system to control the entire computer. The processor 1001 can be configured with a central processing unit (CPU) including an interface with a peripheral device, a control device, a computing device, a register, and the like.

Moreover, the processor 1001 reads a computer program (program code), a software module, data, and the like from the storage 1003 and/or the communication device 1004 into the memory 1002, and executes various processes according to the data. As the computer program, a computer program that is capable of executing on the computer at least a part of the operation explained in the above embodiments is used. Alternatively, various processes explained above can be executed by one processor 1001 or can be executed simultaneously or sequentially by two or more processors 1001. The processor 1001 can be implemented by using one or more chips. Alternatively, the computer program can be transmitted from a network via a telecommunication line.

The memory 1002 is a computer readable recording medium and is configured, for example, with at least one of Read Only Memory (ROM), Erasable Programmable ROM (EPROM), Electrically Erasable Programmable ROM (EEPROM), Random Access Memory (RAM), and the like. The memory 1002 can be called register, cache, main memory (main memory), and the like. The memory 1002 can store therein a computer program (computer program codes), software modules, and the like that can execute the method according to the embodiment of the present disclosure.

The storage 1003 is a computer readable recording medium. Examples of the storage 1003 include an optical disk such as Compact Disc ROM (CD-ROM), a hard disk drive, a flexible disk, a magneto-optical disk (for example, a compact disk, a digital versatile disk, Blu-ray (Registered Trademark) disk), a smart card, a flash memory (for example, a card, a stick, a key drive), a floppy (Registered Trademark) disk, a magnetic strip, and the like. The storage 1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network. The communication device 1004 is also called, for example, a network device, a network controller, a network card, a communication module, and the like.

The communication device 1004 includes a high-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

In addition, the respective devices, such as the processor 1001 and the memory 1002, are connected to each other with the bus 1007 for communicating information there among. The bus 1007 can be constituted by a single bus or can be constituted by separate buses between the devices.

Further, the device is configured to include hardware such as a microprocessor, a digital signal processor (Digital Signal Processor: DSP), Application Specific Integrated Circuit (ASIC), Programmable Logic Device (PLD), and Field Programmable Gate Array (FPGA). Some or all of these functional blocks may be realized by the hardware. For example, the processor 1001 may be implemented by using at least one of these hardware.

Notification of information is not limited to that explained in the above aspect/embodiment, and may be performed by using a different method. For example, the notification of information may be performed by physical layer signaling (for example, Downlink Control Information (DCI), Uplink Control Information (UCI), upper layer signaling (for example, RRC signaling, Medium Access Control (MAC) signaling, notification information (Master Information Block (MIB), System Information Block (SIB)), other signals, or a combination of these. The RRC signaling may be called RRC message, for example, or can be RRC Connection Setup message, RRC Connection Reconfiguration message, or the like.

Each of the above aspects/embodiments can be applied to at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), a system using any other appropriate system, and a next-generation system that is expanded based on these. Further, a plurality of systems may be combined (for example, a combination of at least one of the LTE and the LTE-A with the 5G).

As long as there is no inconsistency, the order of processing procedures, sequences, flowcharts, and the like of each of the above aspects/embodiments in the present disclosure may be exchanged. For example, the various steps and the sequence of the steps of the methods explained above are exemplary and are not limited to the specific order mentioned above.

The specific operation that is performed by the base station in the present disclosure may be performed by its upper node in some cases. In a network constituted by one or more network nodes having a base station, the various operations performed for communication with the terminal may be performed by at least one of the base station and other network nodes other than the base station (for example, MME, S-GW, and the like may be considered, but not limited thereto). In the above, an example in which there is one network node other than the base station is explained; however, a combination of a plurality of other network nodes (for example, MME and S-GW) may be used.

Information, signals (information and the like) can be output from an upper layer (or lower layer) to a lower layer (or upper layer). It may be input and output via a plurality of network nodes.

The input/output information can be stored in a specific location (for example, a memory) or can be managed in a management table. The information to be input/output can be overwritten, updated, or added. The information can be deleted after outputting. The inputted information can be transmitted to another device.

The determination may be made by a value (0 or 1) represented by one bit or by Boolean value (Boolean: true or false), or by comparison of numerical values (for example, comparison with a predetermined value).

Each aspect/embodiment described in the present disclosure may be used separately or in combination, or may be switched in accordance with the execution. In addition, notification of predetermined information (for example, notification of "being X") is not limited to being performed explicitly, it may be performed implicitly (for example, without notifying the predetermined information).

Instead of being referred to as software, firmware, middleware, microcode, hardware description language, or some other name, software should be interpreted broadly to mean instruction, instruction set, code, code segment, program code, program, subprogram, software module, application, software application, software package, routine, subroutine, object, executable file, execution thread, procedure, function, and the like.

Further, software, instruction, information, and the like may be transmitted and received via a transmission medium. For example, when a software is transmitted from a website, a server, or some other remote source by using at least one of a wired technology (coaxial cable, fiber optic cable, twisted pair, Digital Subscriber Line (DSL), or the like) and a wireless technology (infrared light, microwave, or the like), then at least one of these wired and wireless technologies is included within the definition of the transmission medium.

Information, signals, or the like mentioned above may be represented by using any of a variety of different technologies. For example, data, instruction, command, information, signal, bit, symbol, chip, or the like that may be mentioned throughout the above description may be represented by voltage, current, electromagnetic wave, magnetic field or magnetic particle, optical field or photons, or a desired combination thereof.

It should be noted that the terms described in this disclosure and terms necessary for understanding the present disclosure may be replaced by terms having the same or similar meanings. For example, at least one of a channel and a symbol may be a signal (signaling). Also, a signal may be a message. Further, a component carrier (Component Carrier: CC) may be referred to as a carrier frequency, a cell, a frequency carrier, or the like.

The terms "system" and "network" used in the present disclosure can be used interchangeably.

Furthermore, the information, the parameter, and the like explained in the present disclosure can be represented by an absolute value, can be expressed as a relative value from a predetermined value, or can be represented by corresponding other information. For example, the radio resource can be indicated by an index.

The name used for the above parameter is not a restrictive name in any respect. In addition, formulas and the like using these parameters may be different from those explicitly disclosed in the present disclosure. Because the various channels (for example, PUCCH, PDCCH, or the like) and information element can be identified by any suitable name, the various names assigned to these various channels and information elements shall not be restricted in any way.

In the present disclosure, it is assumed that "base station (Base Station: BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and the like can be used interchangeably. The base station may also be referred to with the terms such as a macro cell, a small cell, a femtocell, or a pico cell.

The base station can accommodate one or more (for example, three) cells (also called sectors). In a configuration in which the base station accommodates a plurality of cells, the entire coverage area of the base station can be divided into a plurality of smaller areas. In each such a smaller area, communication service can be provided by a base station subsystem (for example, a small base station for indoor use (Remote Radio Head: RRH)).

The term "cell" or "sector" refers to a part or all of the coverage area of a base station and/or a base station subsystem that performs communication service in this coverage.

In the present disclosure, the terms "mobile station (Mobile Station: MS)", "user terminal", "user equipment (User Equipment: UE)", "terminal" and the like can be used interchangeably.

The mobile station is called by the persons skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable term.

At least one of a base station and a mobile station may be called a transmitting device, a receiving device, a communication device, or the like. Note that, at least one of a base station and a mobile station may be a device mounted on a moving body, a moving body itself, or the like. The moving body may be a vehicle (for example, a car, an airplane, or the like), a moving body that moves unmanned (for example, a drone, an automatically driven vehicle, or the like), a robot (manned type or unmanned type) At least one of a base station and a mobile station can be a device that does not necessarily move during the communication operation. For example, at least one of a base station and a mobile station may be an Internet of Things (IoT) device such as a sensor.

Also, a base station in the present disclosure may be read as a mobile station (user terminal, hereinafter the same). For example, each of the aspects/embodiments of the present disclosure may be applied to a configuration that allows a communication between a base station and a mobile station to be replaced with a communication between a plurality of mobile stations (for example, may be referred to as Device-to-Device (D2D), Vehicle-to-Everything (V2X), or the like). In this case, the mobile station may have the function of the base station. Words such as "uplink" and "downlink" may also be replaced with wording corresponding to inter-terminal communication (for example, "side"). For example, terms an uplink channel, a downlink channel, or the like may be read as a side channel.

Likewise, a mobile station in the present disclosure may be read as a base station. In this case, the base station may have the function of the mobile station.

A radio frame may be composed of one or more frames in the time domain. Each frame or frames in the time domain may be referred to as a subframe.

A subframe may be further configured by one or more slots in the time domain. The subframe may have a fixed time length (e.g., 1 ms) that does not depend on the numerology.

Numerology may be a communication parameter applied to at least one of transmission and reception of a certain signal or channel. The numerology can include one among, for example, subcarrier spacing (SubCarrier Spacing: SCS), bandwidth, symbol length, cyclic prefix length, transmission time interval (TTI), number of symbols per TTI, radio frame configuration, a specific filtering process performed by a transceiver in the frequency domain, a specific windowing process performed by a transceiver in the time domain, and the like.

The slot may be configured with one or a plurality of symbols (Orthogonal Frequency Division Multiplexing (OFDM)) symbols, Single Carrier Frequency Division Multiple Access (SC-FDMA) symbols, etc.) in the time domain. A slot may be a unit of time based on the numerology.

A slot may include a plurality of minislots. Each minislot may be configured with one or more symbols in the time domain. A minislot may also be called a subslot. A minislot may be composed of fewer symbols than slots. PDSCH (or PUSCH) transmitted in a time unit larger than a minislot may be referred to as PDSCH (or PUSCH) mapping type A. PDSCH (or PUSCH) transmitted using a minislot may be referred to as PDSCH (or PUSCH) mapping type B.

Each of the radio frame, subframe, slot, minislot, and symbol represents a time unit for transmitting a signal. Different names may be used for the radio frame, subframe, slot, minislot, and symbol.

For example, one subframe may be called a transmission time interval (TTI), a plurality of consecutive subframes may be called TTI, and one slot or one minislot may be called TTI. That is, at least one between a subframe and TTI may be a subframe (1 ms) in existing LTE, or may be shorter than 1 ms (for example, 1 to 13 symbols), or a period longer than 1 ms. Note that, a unit representing TTI may be called a slot, a minislot, or the like instead of a subframe.

Here, TTI refers to the minimum time unit of scheduling in radio communication, for example. For example, in the LTE system, the base station performs scheduling for allocating radio resources (frequency bandwidth, transmission power, etc. that can be used in each user terminal) to each user terminal in units of TTI. The definition of TTI is not limited to this.

The TTI may be a transmission time unit such as a channel-encoded data packet (transport block), a code block, or a code word, or may be a processing unit such as scheduling or link adaptation. When TTI is given, a time interval (for example, the number of symbols) in which a transport block, a code block, a code word, etc. are actually mapped may be shorter than TTI.

When one slot or one minislot is called TTI, one or more TTIs (that is, one or more slots or one or more minislots) may be the minimum scheduling unit. Further, the number of slots (the number of minislots) constituting the minimum time unit of the scheduling may be controlled.

TTI having a time length of 1 ms may be referred to as an ordinary TTI (TTI in LTE Rel. 8-12), a normal TTI, a long TTI, a normal subframe, a normal subframe, a long subframe, a slot, and the like. TTI shorter than the ordinary TTI may be referred to as a shortened TTI, a short TTI, a partial TTI (partial or fractional TTI), a shortened subframe, a short subframe, a minislot, a subslot, a slot, and the like.

In addition, a long TTI (for example, ordinary TTI, subframe, etc.) may be read as TTI having a time length exceeding 1 ms, and a short TTI (for example, shortened TTI) may be read as TTI having TTI length of less than the TTI length of the long TTI but TTI length of 1 ms or more.

The resource block (RB) is a resource allocation unit in the time domain and frequency domain, and may include one or a plurality of continuous subcarriers in the frequency domain. The number of subcarriers included in RB may be, for example, twelve, and the same regardless of the numerology. The number of subcarriers included in the RB may be determined based on the numerology.

Also, the time domain of RB may include one or a plurality of symbols, and may have a length of 1 slot, 1 minislot, 1 subframe, or 1 TTI. Each TTI, subframe, etc. may be composed of one or more resource blocks.

Note that, one or more RBs may be called a physical resource block (Physical RB: PRB), a subcarrier group (Sub-Carrier Group: SCG), a resource element group (Resource Element Group: REG), PRB pair, RB pair, etc.

A resource block may be configured by one or a plurality of resource elements (Resource Element: RE). For example, one RE may be a radio resource area of one subcarrier and one symbol.

A bandwidth part (BWP) (which may be called a partial bandwidth, etc.) may represent a subset of contiguous common resource blocks (RBs) for a certain numerology in a certain carrier. Here, a common RB may be specified by RB index based on the common reference point of the carrier. PRB may be defined in BWP and numbered within that BWP.

BWP may include UL BWP (UL BWP) and DL BWP (DL BWP). One or a plurality of BWPs may be set in one carrier for the UE.

At least one of the configured BWPs may be active, and the UE may not expect to send and receive certain signals/channels outside the active BWP. Note that "cell", "carrier", and the like in this disclosure may be read as "BWP".

The above-described structures such as a radio frame, subframe, slot, minislot, and symbol are merely examples. For example, the number of subframes included in a radio frame, the number of slots per subframe or radio frame, the number of minislots included in a slot, the number of symbols and RBs included in a slot or minislot, the subcarriers included in RBs, and the number of symbols included in TTI, a symbol length, the cyclic prefix (CP) length, and the like can be changed in various manner.

The terms "connected", "coupled", or any variations thereof, mean any direct or indirect connection or coupling between two or more elements. Also, one or more intermediate elements may be present between two elements that are "connected" or "coupled" to each other. The coupling or connection between the elements may be physical, logical, or a combination thereof. For example, "connection" may be read as "access". In the present disclosure, two elements can be "connected" or "coupled" to each other by using one or more wires, cables, printed electrical connections, and as some non-limiting and non-exhaustive examples, by using electromagnetic energy having wavelengths in the microwave region and light (both visible and invisible) regions, and the like.

The reference signal may be abbreviated as Reference Signal (RS) and may be called pilot (Pilot) according to applicable standards.

As used in the present disclosure, the phrase "based on" does not mean "based only on" unless explicitly stated otherwise. In other words, the phrase "based on" means both "based only on" and "based at least on".

The "means" in the configuration of each apparatus may be replaced with "unit", "circuit", "device", and the like.

Any reference to an element using a designation such as "first", "second", and the like used in the present disclosure generally does not limit the amount or order of those elements. Such designations can be used in the present disclosure as a convenient way to distinguish between two or more elements. Thus, the reference to the first and second elements does not imply that only two elements can be adopted, or that the first element must precede the second element in some or the other manner.

In the present disclosure, the used terms "include", "including", and variants thereof are intended to be inclusive in a manner similar to the term "comprising". Furthermore, the term "or" used in the present disclosure is intended not to be an exclusive disjunction.

Throughout this disclosure, for example, during translation, if articles such as a, an, and the in English are added, in this disclosure, these articles shall include plurality of nouns following these articles.

As used in this disclosure, the terms "determining" and "determining" may encompass a wide variety of actions. "Judgment" and "decision" includes judging or deciding by, for example, judging, calculating, computing, processing, deriving, investigating, looking up, search, inquiry (e.g., searching in a table, database, or other data structure), ascertaining, and the like. In addition, "judgment" and "decision" can include judging or deciding by receiving (for example, receiving information), transmitting (for example, transmitting information), input (input), output (output), and access (accessing) (e.g., accessing data in a memory). In addition, "judgement" and "decision" can include judging or deciding by resolving, selecting, choosing, establishing, and comparing. In other words, "judgement" and "decision" may include considering some operation as "judged" and "decided". Moreover, "judgment (decision)" may be read as "assuming", "expecting", "considering", and the like.

In the present disclosure, the term "A and B are different" may mean "A and B are different from each other". It should be noted that the term may mean "A and B are each different from C". Terms such as "leave", "coupled", or the like may also be interpreted in the same manner as "different".

Although the present disclosure has been described in detail above, it will be obvious to those skilled in the art that the present disclosure is not limited to the embodiments described in this disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

EXPLANATION OF REFERENCE NUMERALS

10 Radio communication system
20 NG-RAN
100 gNB
200 UE
1001 Processor
1002 Memory
1003 Storage
1004 Communication device
1005 Input device
1006 Output device
1007 Bus

The invention claimed is:

1. A terminal comprising:
a receiver that receives a radio frame having a second slot pattern to be used in a case in which a modulation system different from a modulation system in a case of using a first slot pattern is applied; and
a processor that applies even for the second slot pattern a configuration of an uplink and a downlink according to a time division duplex in the radio frame by using a reference subcarrier spacing same as a reference subcarrier spacing for the first slot pattern,
wherein the terminal supports Faster-Than-Nyquist (FTN) transmission,
wherein the processor is further configured to apply a Discrete Fourier Transform-Spread-Orthogonal Frequency Division Multiplexing (DFT-S-OFDM), and
wherein the processor is further configured to use a combination of the FTN and the DFT-S-OFDM to equalize a frequency-domain.

2. A terminal comprising:
a receiver that receives a radio frame having a second slot pattern to be used in a case in which a modulation system different from a modulation system in a case of using a first slot pattern is applied; and
a processor that determines for the second slot pattern a reference subcarrier spacing on the basis of a configuration of the modulation system, and applies a configuration of an uplink and a downlink according to a time division duplex in the radio frame,
wherein the terminal supports Faster-Than-Nyquist (FTN) transmission,
wherein the processor is further configured to apply a Discrete Fourier Transform-Spread-Orthogonal Frequency Division Multiplexing (DFT-S-OFDM), and
wherein the processor is further configured to use a combination of the FTN and the DFT-S-OFDM to equalize a frequency-domain.

3. A terminal comprising:

a receiver that receives a radio frame having a second slot pattern to be used in a case in which a modulation system different from a modulation system in a case of using a first slot pattern is applied; and a processor that applies for the second slot pattern same configuration as in a case of using the first slot pattern for at least one of a common configuration of an uplink and a downlink according to a time division duplex, and a dedicated configuration for the uplink and the downlink according to the time division duplex, wherein the terminal supports Faster-Than-Nyquist (FTN) transmission, wherein the processor is further configured to apply a Discrete Fourier Transform-Spread-Orthogonal Frequency Division Multiplexing (DFT-S-OFDM), and wherein the processor is further configured to use a combination of the FTN and the DFT-S-OFDM to equalize a frequency-domain.

* * * * *